US007237237B2

(12) United States Patent
Foti

(10) Patent No.: US 7,237,237 B2
(45) Date of Patent: Jun. 26, 2007

(54) DESIGNATING AN OBJECT FOR DESTRUCTION

(75) Inventor: David A. Foti, Ashland, MA (US)

(73) Assignee: The Mathworks, Inc., Natick, MA (US)

(*) Notice: Subject to any disclaimer, the term of this patent is extended or adjusted under 35 U.S.C. 154(b) by 675 days.

(21) Appl. No.: 09/912,720

(22) Filed: Jul. 24, 2001

(65) Prior Publication Data
US 2003/0023768 A1    Jan. 30, 2003

(51) Int. Cl.
G06F 9/45     (2006.01)
G06F 9/44     (2006.01)
G06F 17/30    (2006.01)
G06F 12/00    (2006.01)

(52) U.S. Cl. .................. 717/158; 717/116; 717/118; 717/148; 717/151; 707/206; 711/6

(58) Field of Classification Search ............... 717/155, 717/5, 148, 153, 127, 140, 170, 124, 159, 717/131, 116, 118, 151, 158; 707/206; 711/100, 711/5, 6, 170, 203; 716/18; 719/316
See application file for complete search history.

(56) References Cited

U.S. PATENT DOCUMENTS

| 5,485,613 | A | * | 1/1996 | Engelstad et al. | ........... 707/206 |
| 5,675,803 | A | * | 10/1997 | Preisler et al. | ............... 717/131 |
| 5,799,185 | A | * | 8/1998 | Watanabe | .................... 707/206 |
| 6,047,295 | A | * | 4/2000 | Endicott et al. | ............ 707/206 |
| 6,061,721 | A | | 5/2000 | Ismael et al. | ................ 709/223 |
| 6,173,444 | B1 | * | 1/2001 | Archambault | ................ 717/159 |
| 6,230,160 | B1 | | 5/2001 | Chan et al. | ............. 707/103 X |
| 6,249,793 | B1 | * | 6/2001 | Printezis et al. | ............. 707/206 |
| 6,282,699 | B1 | | 8/2001 | Zhang et al. | |
| 6,289,395 | B1 | | 9/2001 | Apte et al. | ................... 709/318 |
| 6,363,403 | B1 | * | 3/2002 | Roy et al. | ..................... 707/206 |
| 6,370,684 | B1 | * | 4/2002 | De Pauw et al. | ........... 717/124 |
| 6,381,738 | B1 | * | 4/2002 | Choi et al. | ................... 717/140 |
| 6,421,690 | B1 | * | 7/2002 | Kirk, III | ...................... 707/206 |
| 6,438,616 | B1 | * | 8/2002 | Callsen et al. | .............. 719/316 |
| 6,467,075 | B1 | * | 10/2002 | Sato et al. | ..................... 716/18 |
| 6,499,095 | B1 | * | 12/2002 | Sexton et al. | ............... 711/203 |
| 6,502,110 | B1 | * | 12/2002 | Houldsworth | ............... 707/206 |
| 6,526,422 | B1 | * | 2/2003 | Flood et al. | ................ 707/206 |

(Continued)

OTHER PUBLICATIONS

Tiernan, "An Efficient Search Algorithm to Find the Elementary Circuits of a Graph", *Comm. of the ACM,*.13:722-726, (1970).

(Continued)

*Primary Examiner*—Meng-Al T. An
*Assistant Examiner*—Insun Kang
(74) *Attorney, Agent, or Firm*—Lahive & Cockfield, LLP

(57) ABSTRACT

A method for controlling disposition of a candidate object in an object-oriented programming environment is disclosed. The method may include the step of determining the number of cyclic paths that include the candidate object in the object-oriented programming environment. The method may also include the step of determining a number of internal references to the candidate object. The internal references are references from other objects in the object-oriented programming environment. The method may control the disposition of the candidate object on the basis of a predetermined relationship between the number of the internal references and the number of the cyclic paths.

28 Claims, 20 Drawing Sheets

U.S. PATENT DOCUMENTS

| | | | |
|---|---|---|---|
| 6,604,182 B1* | 8/2003 | Sexton et al. | 711/170 |
| 6,675,379 B1* | 1/2004 | Kolodner et al. | 717/155 |
| 6,701,334 B1* | 3/2004 | Ye et al. | 707/206 |
| 6,757,890 B1* | 6/2004 | Wallman | 717/148 |
| 6,760,825 B1* | 7/2004 | Sexton et al. | 711/170 |
| 2001/0013117 A1* | 8/2001 | Ungar | 717/5 |
| 2001/0056522 A1* | 12/2001 | Satyanarayana | 711/170 |
| 2002/0056019 A1* | 5/2002 | Kolodner et al. | 711/6 |
| 2002/0062419 A1* | 5/2002 | Konson et al. | 711/5 |
| 2002/0129343 A1* | 9/2002 | Pinter et al. | 717/140 |
| 2002/0178437 A1* | 11/2002 | Blais et al. | 717/140 |
| 2002/0194421 A1* | 12/2002 | Berry et al. | 711/100 |
| 2004/0015873 A1* | 1/2004 | Sokolov et al. | 717/127 |
| 2004/0015920 A1* | 1/2004 | Schmidt | 717/153 |

OTHER PUBLICATIONS

Tarjan, "Depth-First Search and Linear Graph Algorithms", SIAM J. Comp., 1:146-160, (Jun. 1972).

Tarjan, "Enumeration of the Elementary Circuits of a Directed Graph" *Cornell University Technical Report TR* 72-145 (1972).

Weinblatt, "A New Search Algorithm for Finding the Simple Cycles of a Finite Directed Graph", *JACM* 19:43-56 (Jan. 1972).

IBM Technical Disclosure Bulletin, Generating Event Adapters to Facilitate Connections Between Java Beans, Jan. 1, 1998, p. 1-3.

John Henry Moore, Microsoft's New, Improved Proxy Server, Dec. 1997, p. 1-3.

Samir B. Gehani, A Java Based Framework for Explicitly Partitioning, 1997, Section 3.1 Java Beans.

David M. Gay, Symbolic-Algebraic Computations in a Modeling Language for Mathematical Programming, Nov. 1999, Schloss Dagstuhl, p. 4-7.

Hartmut Pohlheim, Genetic and Evolutionary Algorithm Toolbox for use with MATLAB, Jul. 1997.

* cited by examiner

ACYCLIC NODE

DESIGNATING AN OBJECT FOR DESTRUCTION

FIELD OF INVENTION

This invention relates to the management of objects in an object-oriented environment, and in particular, to automating the process of deciding when to destroy an object.

BACKGROUND

In an object-oriented programming environment, a user typically creates objects that interact with other objects in the environment. Each object in the environment consumes system resources. Examples of such system resources include memory, sockets, and file handles. Thus, when an object is no longer needed, it is desirable to destroy the object, thereby freeing those system resources consumed by that object.

A difficulty associated with destroying an object arises from the manner in which objects are linked to each other. For example, suppose a first object refers to a second object. If the first object is to be destroyed, or if the link between the first and second objects is to be severed, then the second object can also be destroyed, provided no other object in the environment interacts with the second object. However, if any other object in the environment interacts with the second object, then the second object should not be destroyed.

One example of an object-oriented programming environment is an environment for simulating a dynamic system by creating block diagrams in which each block represents a transfer function of a constituent element of the dynamic system. In such an environment, each block is an object that is linked to one or more other blocks. When a first block is removed from the system, it may be possible to remove a second block with which that first block communicates, provided that no other block is linked to that second block.

In principle, it is possible for a de-allocation process to examine each object in the environment to determine whether destruction of a particular object, or the severing of a link between two objects, should trigger destruction of any other objects. However, as the number of objects and the number of links between objects increases, the time required to perform this task quickly becomes prohibitive.

SUMMARY

In an object-oriented programming environment, an object is often referred to. A reference to an object can be made either by another object, or by something other than an object, for example a local variable or a global variable. The former references are referred to as "internal references" and the latter as "external references".

When a reference is deleted, the possibility exists that the object referred to can also be destroyed. The invention is based on the recognition that by separately accounting for internal references and external references to an object, it becomes possible and efficient, following deletion of any reference, to automatically designate that object for either destruction or preservation.

In a method according to the invention, a first value, indicative of a number of references to the candidate object that are not references from other objects, is determined. The disposition of the object is then controlled on the basis of this first value. For example, the disposition of the candidate object on the basis of the first value can include determining, on the basis of the first value, whether there exists any reference to the candidate object that is not from another object. If at least one reference to the candidate object is not from another object, the candidate object is marked for preservation.

As used herein, "disposition" of an object means determining whether an object is in use and, on the basis of that determination, marking the object for either destruction or preservation.

Even when all references to a candidate object are from other objects, there are cases in which the candidate object should be preserved. For example, if a candidate object simply lies on a path that passes through another object having a reference originating from outside the object-oriented environment, that candidate object should be preserved.

To identify such cases, a method for practicing the invention can also include determining a second value indicative of a number of references to the candidate object that are from other objects. A third value, indicative of a number of cyclic paths that include the candidate object, is then determined. The disposition of the candidate object is then controlled on the basis of the second value and the third value.

Although there may be other methods for determining a third value, the illustrated method includes identifying each object reachable from the candidate object. Each object reachable from the candidate object is then inspected to determine a fourth value and fifth value. The fourth value is indicative of a number of references to the referred object that originate at other objects. The fifth value indicates the number of cyclic paths to the candidate object that pass through the referred object. Both the fourth value and the fifth value are local to, or otherwise associated with, the referred object.

In one practice of the invention, the third value is determined by initializing a sixth value associated with the referred object. This sixth value is indicative of a number of cyclic paths known to include the candidate object and the referred object. The sixth value is then adjusted if the referred object has a reference directly to the candidate object.

Determining a third value can also include identifying a referring object that refers to the referred object and detecting a defined relationship between the fifth value and the sixth value associated with the referred object. If the defined relationship is detected, a seventh value associated with the referring object is adjusted. This seventh value is indicative of a number of known cyclic paths that include both the candidate object and the referring object. In one practice of the invention, the existence of a defined relationship between the fifth and sixth value depends on the equality of the fifth and sixth values. Upon detection of the defined relationship, the seventh value can be adjusted, for example by an amount that corresponds to the sixth value.

In another practice of the invention, controlling disposition of the candidate object on the basis of the second value and the third value includes determining if the candidate object is externally unreachable or externally reachable. On the basis of this determination, the candidate object is designated for either destruction or preservation. In particular, a candidate object that is found externally reachable is designated for preservation, whereas one that is found externally unreachable is designated for destruction.

In another practice of the invention, determining a third value includes classifying any path leading to the candidate object as either originating at an external reference or not originating at an external reference. In this case, disposition of the candidate object includes designating that object for destruction if no path to that object originates at an external reference.

In the foregoing practice of the invention, classifying a path can include, for each object on the path, determining if the object has an external reference; and classifying the path on the basis of whether at least one object on the path has an external reference.

In some cases, references between objects form a tree in which there are no cyclic paths. If a candidate object is known to be on a tree, the known absence of cyclic paths can be used to optimize the process of identifying objects for destruction. Thus, in one practice of the invention, references used to form trees are not counted in the second value. Thus, if all internal references to the candidate object are part of a tree, no cycle detection is executed and the object is preserved as long as it is still connected through a tree reference.

In another practice of the invention, automatic control of disposition of a candidate object in an object-oriented programming environment is achieved by first detecting deletion of a reference to a candidate object. The number of cyclic paths that include the candidate object and the number of internal references to the candidate object are then determined. The disposition of the object is then controlled on the basis of a defined relationship between the number of internal references and the number of cyclic paths.

These and other features and objects of the invention will be apparent from an examination of the following detailed description and the figures, in which:

Figure 4A:
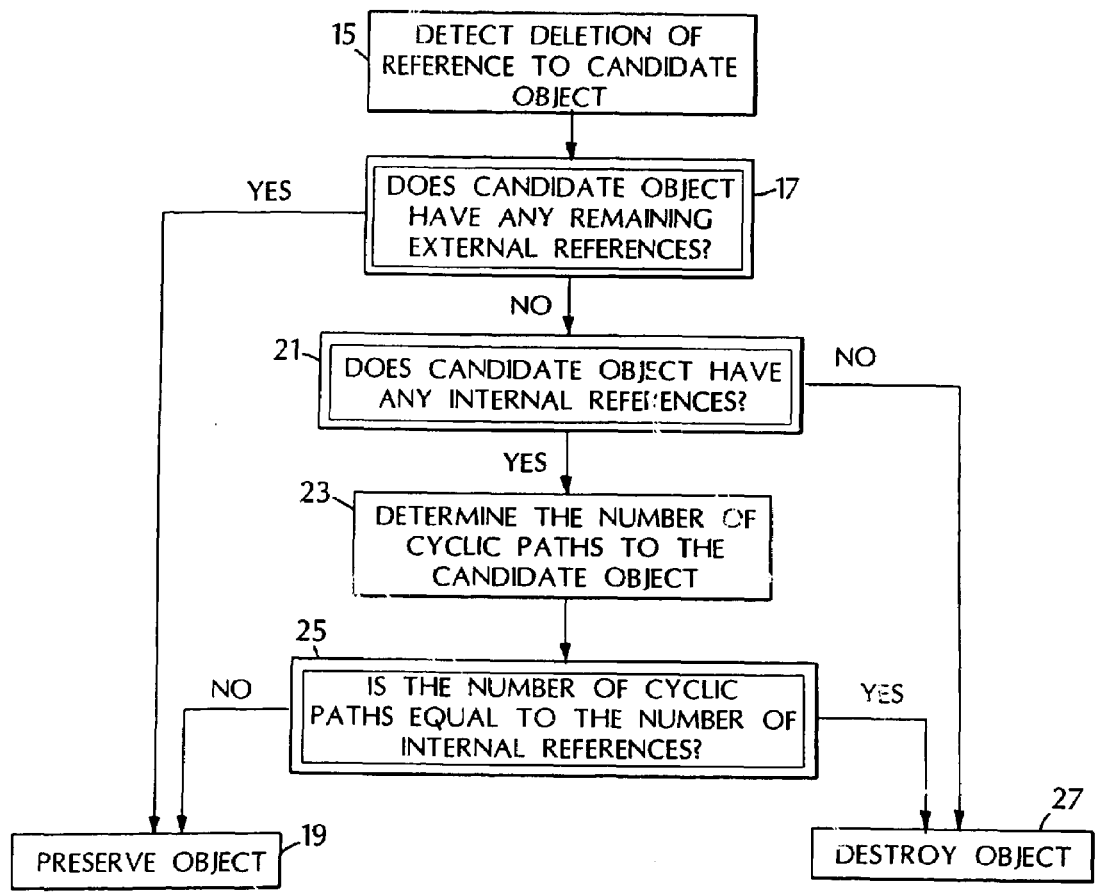
FIGS. 4A-F and FIGS. 32-32B are flow charts.
Figure 4B:
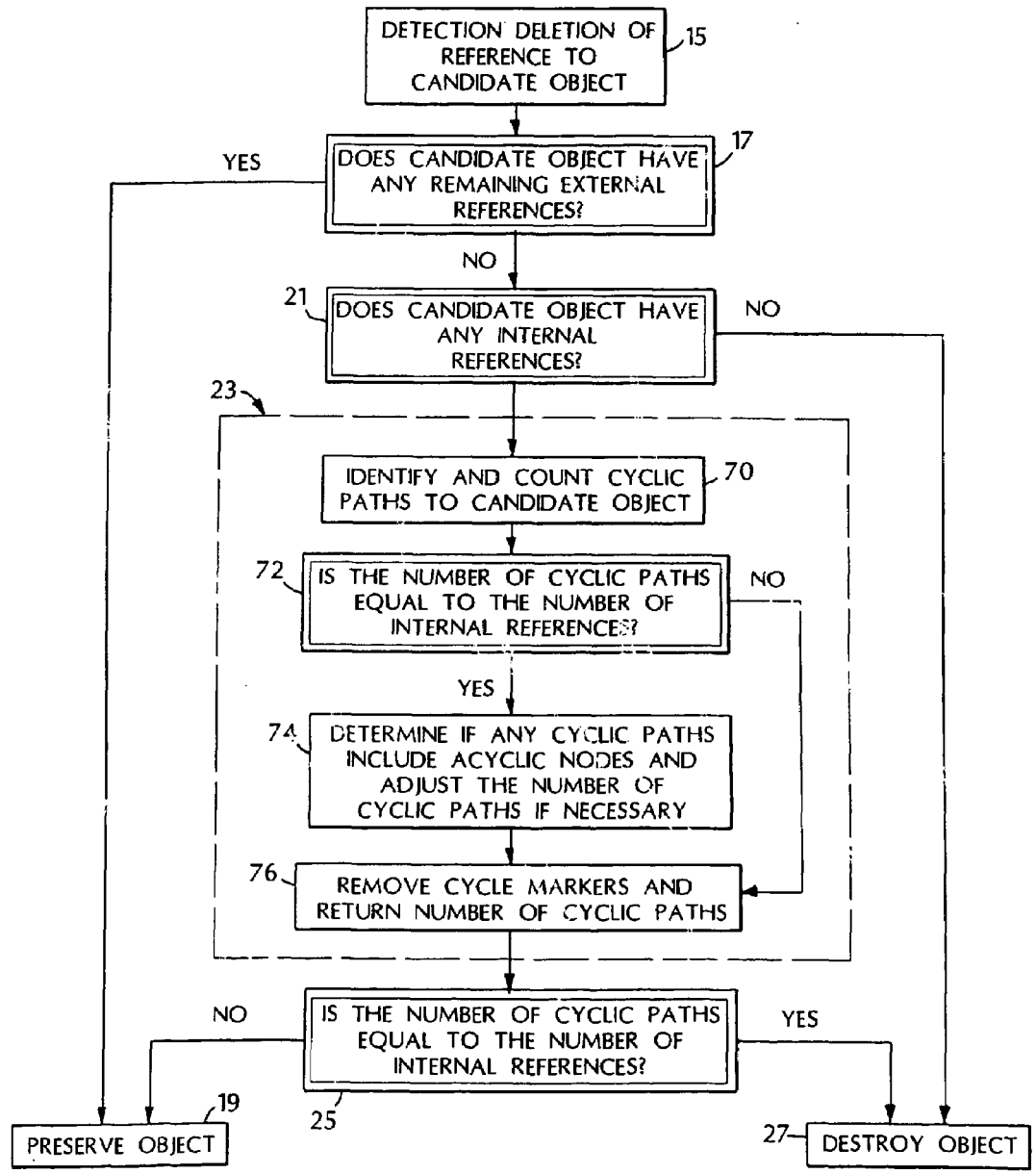
Figure 4C:
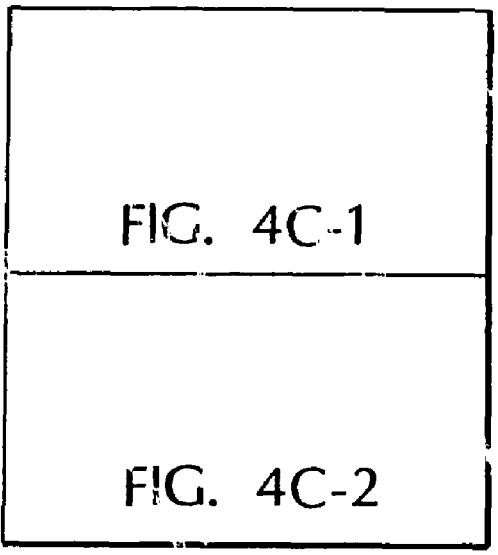
Figures 1, 4C:
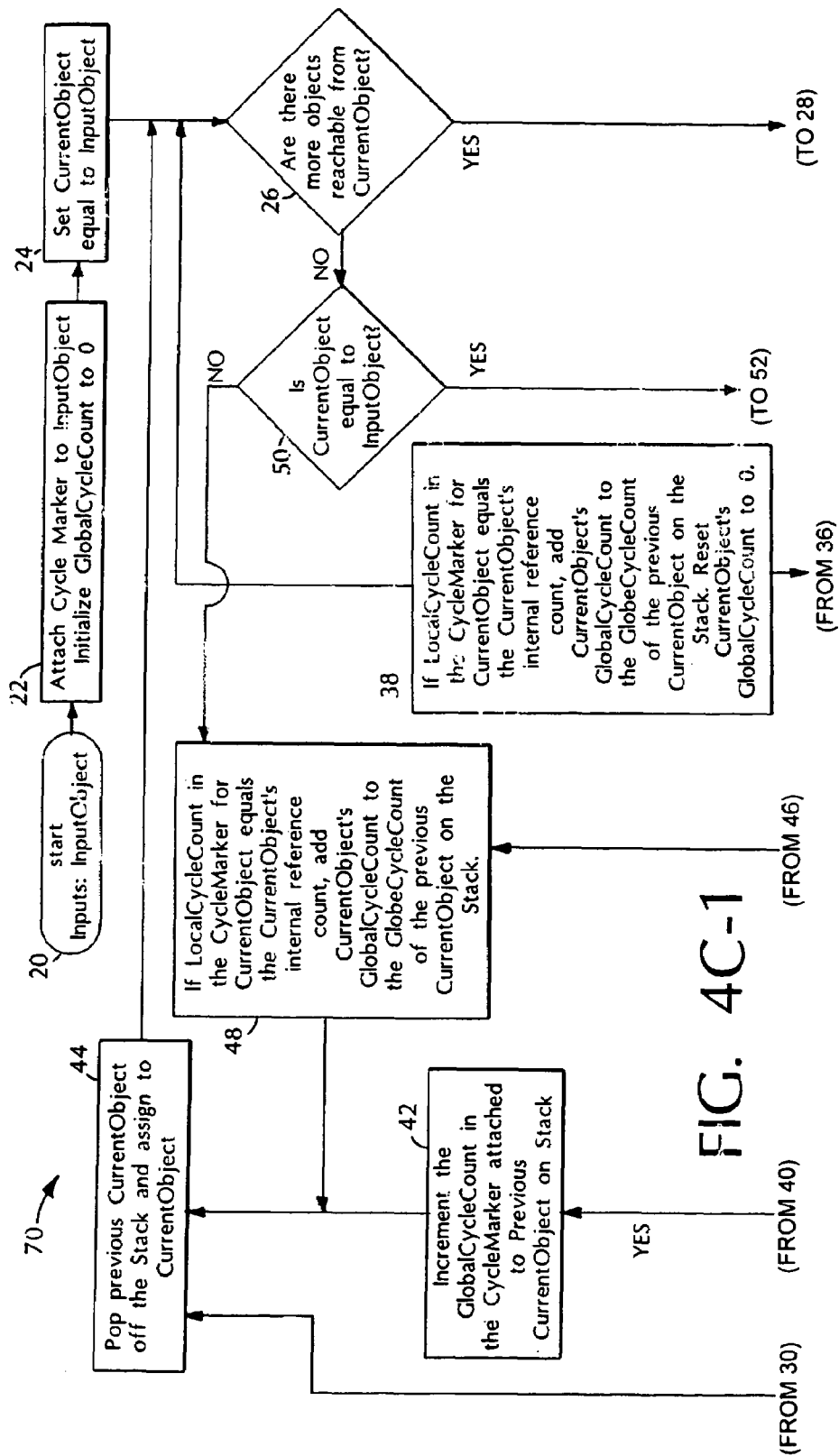
Figures 2, 4C:
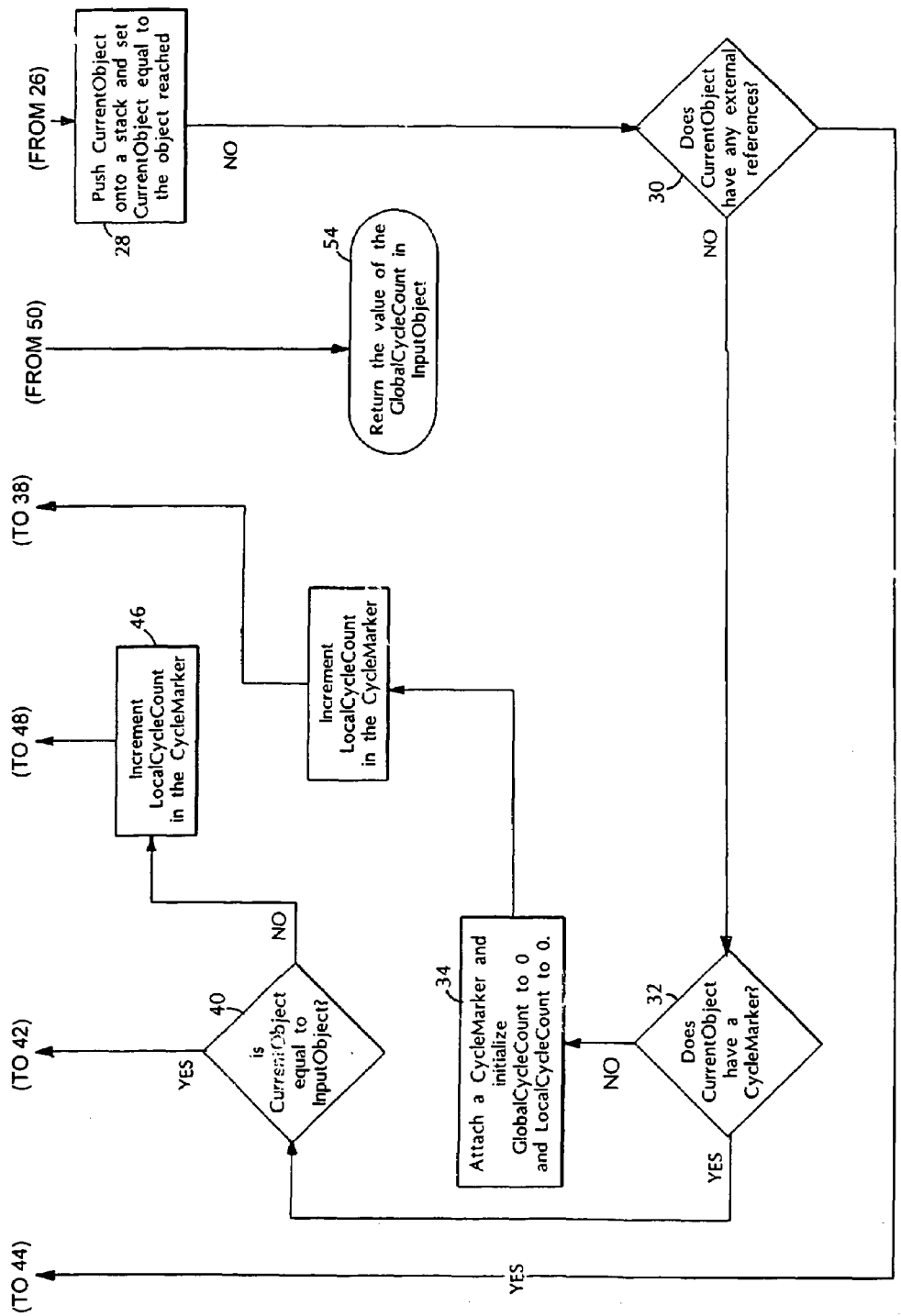
Figure 4D:
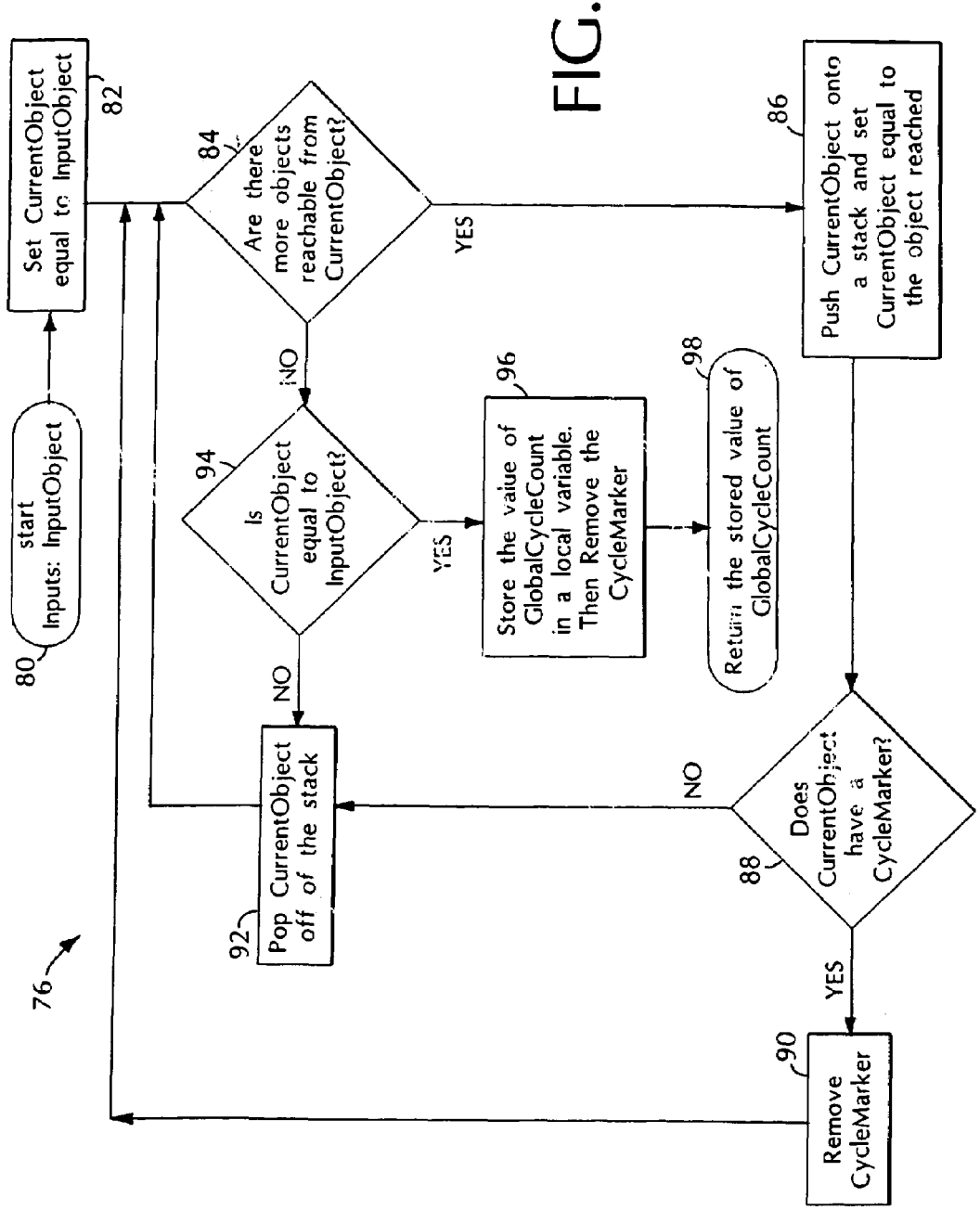
Figure 4E:
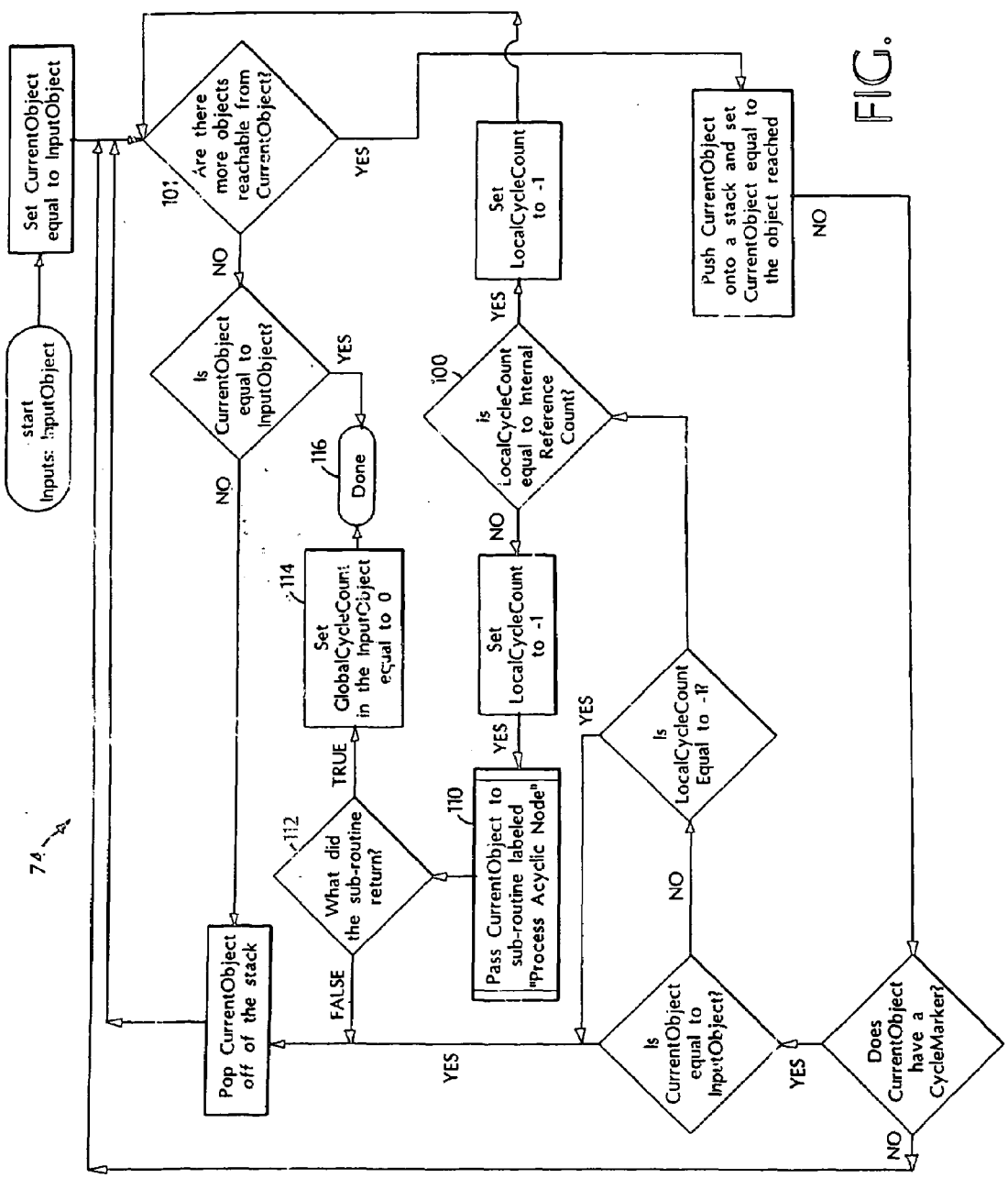
Figure 4F:
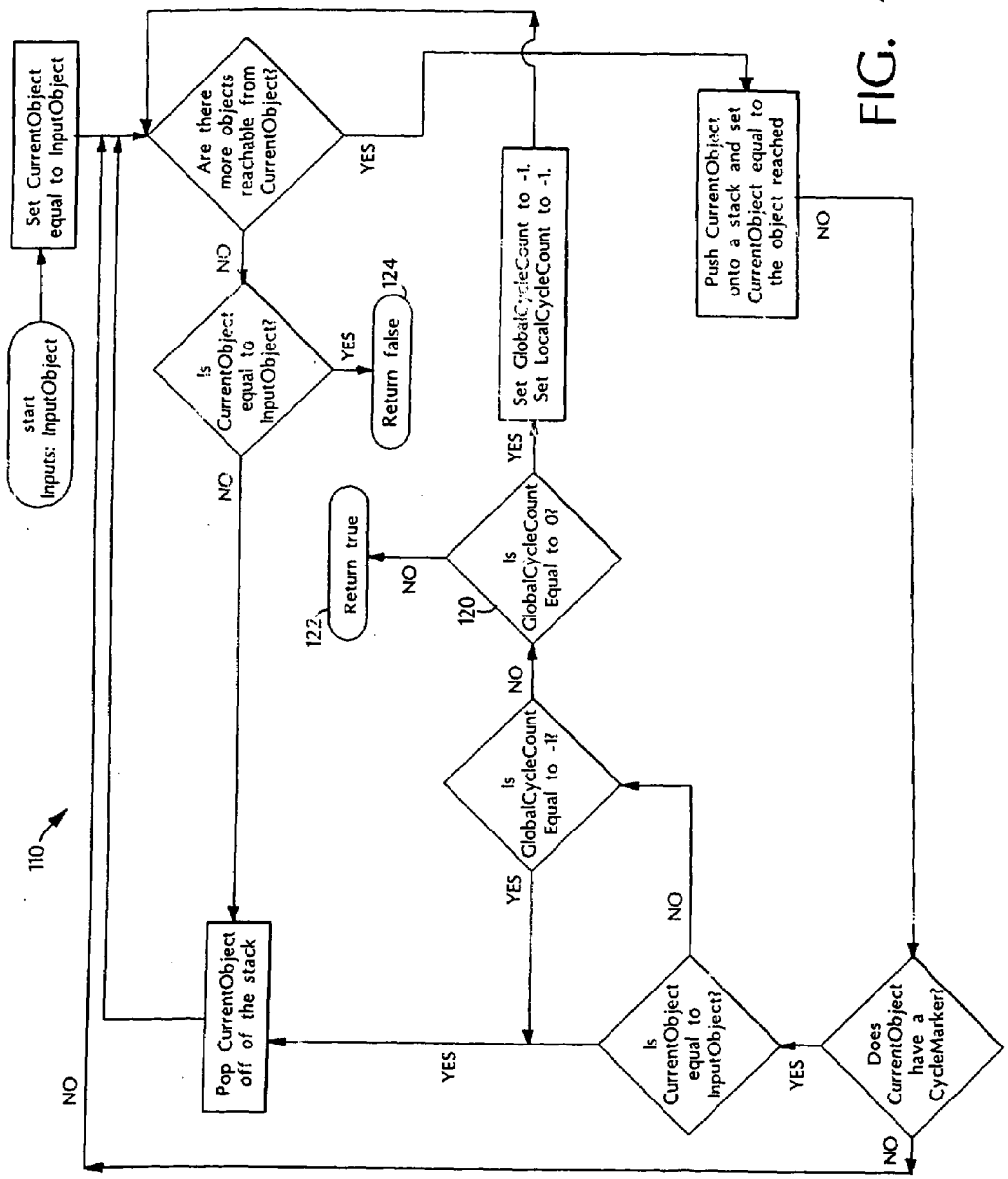
Figure 6:
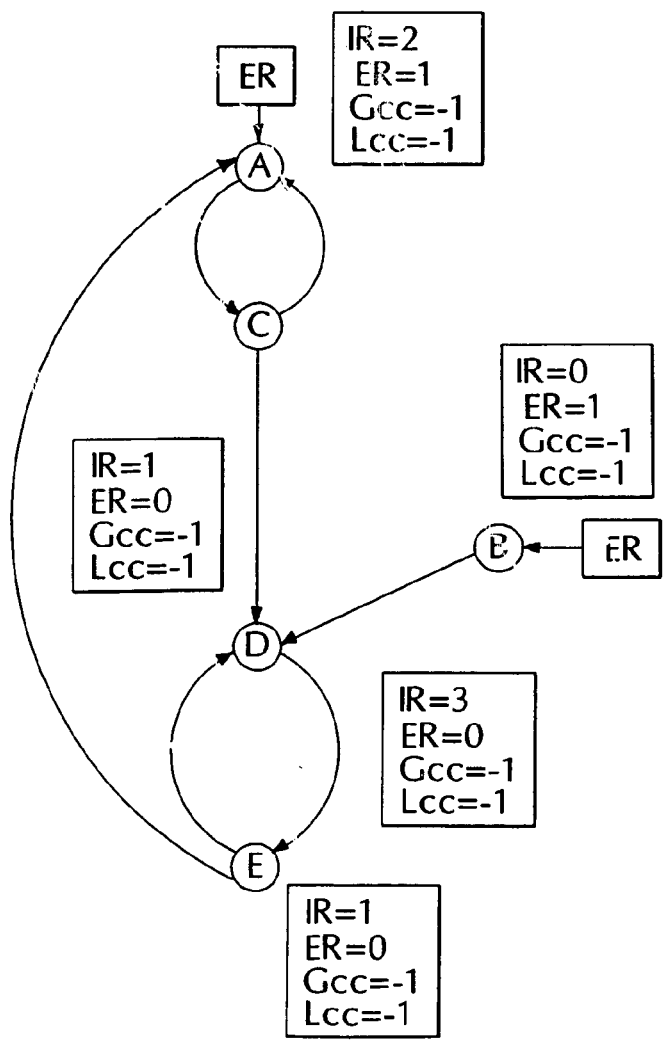
FIG. 6 is a directed graph of object relationships.
Figure 18:
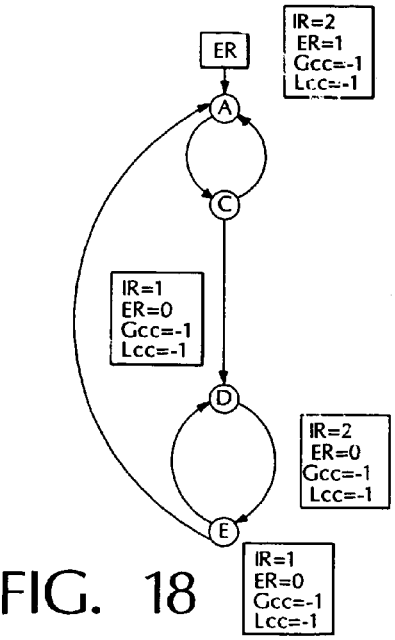
Figure 30:
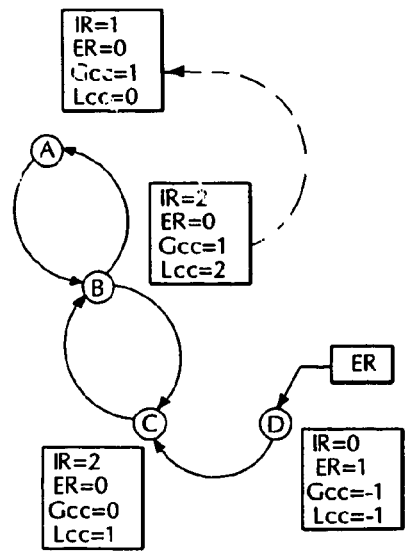
Figure 31:
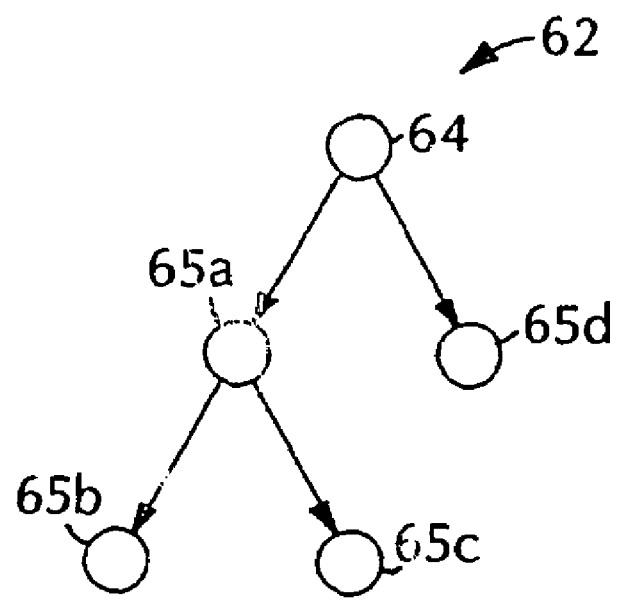

FIG, 18 shows a directed graph similar to that shown in FIG. 6, but with an external reference missing;

FIGS. 19–29 show the directed graph of FIG. 18 at several stages during execution of the method illustrated in FIG. 4C;

FIG. 30 shows a directed graph having an acyclic node not detected by FIG. 4C, but detected by the method of FIG. 4E–F; and FIG. 31 shows a data structure corresponding to a tree of objects.

DETAILED DESCRIPTION

In an object-oriented environment, a "class" can be thought of as a blank form that, when filled in, becomes an object. The blanks that are filled in to create an object are known by many names, for example "state variables", "properties", "data members" and "fields". The process of creating an object includes "filling in" these blanks.

One way to "fill-in" a blank (hereafter referred to as "assigning a field value") is to provide a reference to a second object. A reference of this type, which points from the first object to the second object, is referred to herein as an "internal reference." The term "internal" is used because the reference originates from within an object.

In the example above, a second object can also include an internal reference to a third object, which itself can have an internal reference to a fourth object, and so on. In some cases, an object might refer back to an earlier object. For example, the fourth object may have a field value that refers to the first object.

In some cases, a reference to an object originates not from another object but from outside any other object. For example, a local or global variable, which is itself not an object, may nevertheless refer to an object. Such a reference is referred to herein as an "external reference" because it does not originate from within an object.

Figure 1:
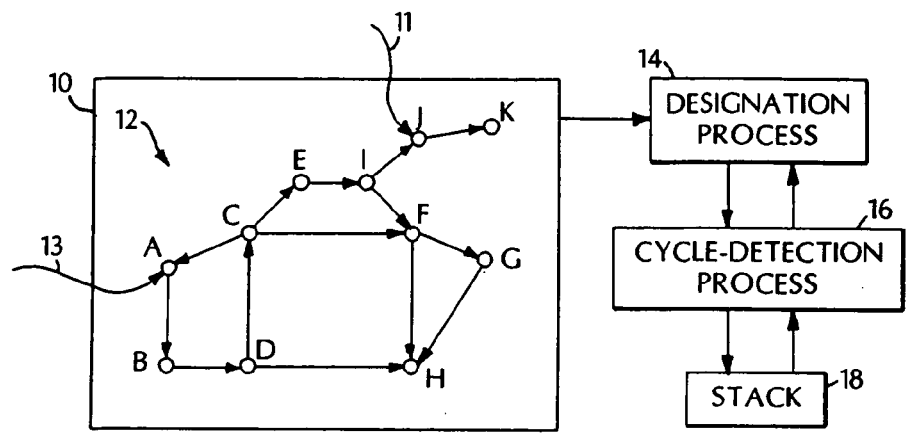
FIG. 1 shows a directed graph representative of an object oriented programming environment.

The relationship of objects within an object-oriented environment 10 as described above can be modeled as a directed graph 12 (also referred to as a "digraph), shown in FIG. 1. The digraph 12 includes several nodes A–K, which represent objects. The terms "node" and "object" are thus used interchangeably throughout this specification. These nodes are connected to each other by "links", also referred to as "references" to and from an object. Thus, an arrow from a first object to a second object indicates that the first object refers to the second object. These references are internal references because they represent interactions between the objects. Certain nodes, for example nodes A and J, are referred to from local variables. These nodes are said to have external references.

An object is said to be "externally reachable" if and only if it is possible to reach that object by following a path, which consists of one or more references, that begins with an external reference. All other objects are said to be "externally unreachable". A user or program can no longer accessed an externally unreachable object, hence the object's presence in the environment is superfluous. In general, it is desirable to destroy an object when it becomes externally unreachable.

When the last external reference to an object is removed, one of two things can happen. Either the object becomes externally-unreachable, in which case it can be destroyed, or the object continues to be externally reachable, albeit indirectly, because it lies on a path that originates at an external reference. The invention provides a mechanism for controlling disposition of the object by efficiently distinguishing between externally-reachable objects, which must be preserved, and externally-unreachable objects, which can safely be destroyed.

Figure 2:
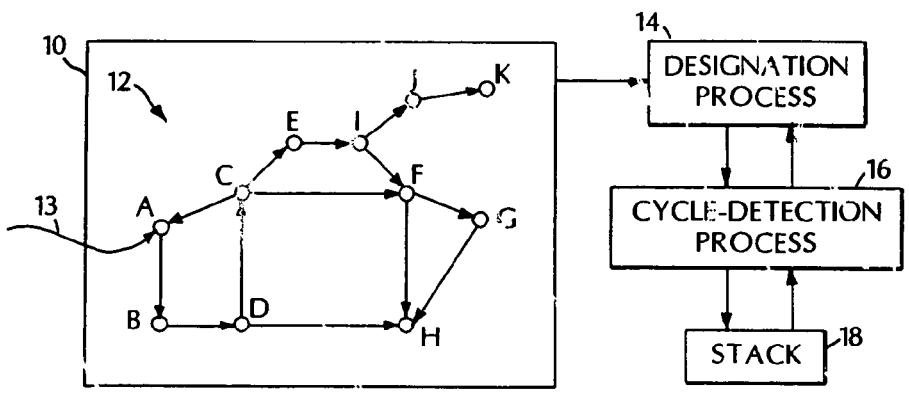
FIG. 2 shows the directed graph of FIG. 1 following deletion of an external reference.
Figure 3:
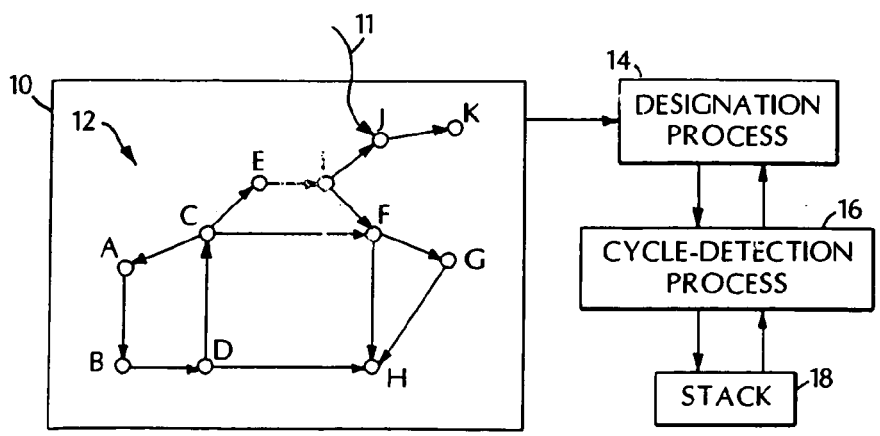
FIG. 3 shows the directed graph of FIG. 1 following deletion of a different external reference.

For example, in FIG. 1, if the external reference 11 to node J were to be severed, as shown in FIG. 2, nodes J and K would continue to be externally reachable. In particular, beginning at the external reference 13 to node A, one could traverse a path through nodes B, D, C, E, and I to reach nodes J and K. The objects corresponding to nodes J and K must therefore be preserved. In contrast, if instead the external reference 13 to node A were to be severed, as shown in FIG. 3, then nodes A through I would all become externally-unreachable and could therefore be destroyed. Only nodes J and K would remain externally reachable. The invention provides a designation process 14 for efficiently distinguishing between the configurations shown in FIGS. 2 and 3. The designation process 14 monitors references to the objects in the environment 10 to determine whether particular objects are still necessary. The designation process 14 communicates with a cycle-detector 16, hereafter referred to as the cycle-detector 16, that determines whether an object that has had a link severed must nevertheless be preserved.

There are many ways that the designation process 14 may be informed about the deletion of a (external or internal) reference. For example, references may send a message to the designation process 14 upon deletion. Alternatively, an object-oriented programming language execution system (examples include a language compiler, interpreter, or virtual machine) might inject invocations to the designation process 14 at the points in the execution stream where an object reference stored in a local variable, global variable, function parameter, or any other storage location goes out of scope or is reassigned to a new value. An execution stream is any representation of the instructions to be executed by the object-oriented language environment including, but not limited to, an array of machine language code, or an array of virtual machine language byte codes.

The cycle-detector 16 traverses all paths leading out from all nodes in the digraph 12. In the illustrated embodiment, this is a recursive procedure. The cycle-detector 16 thus maintains a stack 18 for pushing and popping objects as required.

In some cases, a path can intersect itself. Such a path, which starts and returns to the same object, is referred to in graph theory as a "circuit" or "strongly connected component." In the context of this application, a "cyclic path" is a strongly connected component having the additional properties that: no node within the strongly connected component has an external reference; and no node within the strongly connected component is connected, either directly or indirectly, to an object having an external reference. All other paths are referred to as "acyclic paths."

For a particular object being considered for destruction, hereafter referred to as a "candidate object," the cycle-detector 16 determines the number of cyclic paths to that object and compares that number with the number of internal references to that object. On the basis of this comparison, the designation process 14 designates that candidate object for either destruction or preservation.

FIGS. 4A–F illustrate a particular method for counting the number of cyclic paths to a candidate object. FIG. 4A provides an overview of the interaction between the designation process 14 and the cycle-detector 16. FIG. 4B provides more detail on the cycle-counting step carried out by the cycle-detector 16. In the illustrated practice of the invention, this process requires at least two, and sometimes three traversals of the digraph to complete. The first traversal, shown in FIG. 4C, obtains a number of cyclic paths for a candidate object. The last traversal, shown in FIG. 4D, removes cycle markers and returns the number of cyclic paths to the designating process 14.

In many cases, the number of cyclic paths computed by the steps shown in FIG. 4C will lead to the correct result. However, for certain anomalous digraph topologies, this is not the case. Accordingly, the illustrated practice includes an optional step, illustrated in FIGS. 4E and 4F, of traversing the digraph to identify such anomalous topologies that cannot be detected until after completion of the first traversal.

FIG. 4A is a flow-chart illustrating the interaction of the designation process 14 and the cycle-detector 16 in one embodiment of the invention. The designation process 14 begins upon the deletion of a reference, either internal or external, to a candidate object (step 15). The designation process 14 then determines whether the candidate object has any remaining external references (step 17). If so, the designation process 14 recognizes the candidate object as being externally-reachable and designates it for preservation (step 19).

As noted above in the discussion of FIGS. 1–3, it is possible for an object to be externally reachable even if there are no external references to that object. In recognition of this, if the designation process 14 determines that there are no more external references to the object, it then asks whether there are any internal references to that object (step 21). If the answer is "no," then the object has neither internal nor external references. Such an object is not reachable at all, whether internally or externally. Hence, it can safely be destroyed (step 27). If the answer is "yes", then the designation process 14 instructs the cycle-detector 16 to count the number of cyclic paths (step 23) leading to the candidate object.

The designation process 14 then compares the number of cyclic paths to the candidate object with the number of internal references to the candidate object. If the number of cyclic paths is not equal to the number of internal references (step 25), then it follows that there continues to be a way to reach the candidate object from an external reference. In this case, the designation process 14 designates the object for preservation (step 19). On the other hand, if this number of cyclic paths is equal to the number of internal references, then none of the internal references can originate at an external reference. In this case, the designation process 14 recognizes the candidate object as having become externally unreachable and designates it for destruction (step 27).

As indicated in FIG. 4B, the process of determining the number of cyclic paths is itself made up of several steps. First, the cycle-detector 16 determines a preliminary number of cyclic paths to the candidate object (step 70). However, certain types of nodes, referred to as "acyclic nodes", can in some cases introduce an error. If a cyclic path includes any acyclic nodes, it is possible, depending on the digraph topology, that the candidate object should be preserved, even though the preliminary number of cyclic paths from the procedure of step 70 indicates otherwise.

Figure 5:
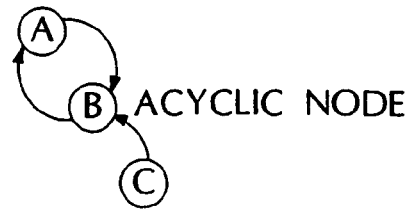
FIG. 5 illustrates an acyclic node.

An "acyclic node" is a node that lies on both a cyclic path and on an acyclic path. For example, in the digraph shown in FIG. 5, there exists a reference from node A to node B and another reference from node B to node A. Thus, node B lies on a cyclic path. In addition, there is a reference to node B from node C. Thus, node B also lies on an acyclic path. Node B is therefore an acyclic node.

Once the digraph has been traversed, the cycle-detector 16 asks whether the number of cyclic paths is equal to the number of internal references to the candidate object (step 72). If the answer is yes, then the cycle-detector determines whether the digraph has any acyclic nodes (step 74). If the answer is no, then the number cyclic paths is deemed to be a reliable indicator of the disposition of a candidate object. The cycle-detector 16 then executes a procedure that removes all cycle markers from all objects and returns, to the designating process, the number of cyclic paths (step 76). The details of this procedure are discussed below in connection with FIG. 4D.

On the other hand, if the number of cyclic references is equal to the number of internal references, then the cycle-detector 16 executes a procedure to determine whether any of the cyclic paths include an acyclic node. The procedure for performing this function is discussed below in connection with FIGS. 4D and 4E.

FIG. 4C is a flow-chart illustrating details of a method that may be executed by the cycle-detector 16 for traversing the digraph to count the number of cyclic paths to the candidate object. To appreciate the operation of the method, it is useful to consider its application to the digraph shown in FIG. 6.

The digraph of FIG. 6 represents an environment 10 that includes five objects A–E. Two of these objects, namely objects A and B, have both external references and internal references pointing to them. The remaining three objects C, D, E have only internal references pointing to them.

Each object has, associated with it, a pair of static counts. The first static count is an external-reference count (abbreviated as "ER" in the figures) indicating the number of external references to that object. The second static count is an internal-reference count (abbreviated as "IR" in the figures) that indicates the number of internal references to that object. These counts are referred to as "static" counts because they do not change during the execution of the cycle-detection method shown in FIG. 4C.

The separation of references into internal and external references, rather than aggregating references together regardless of their origin, permits the designation process 14 to summarily designate an object for preservation immediately upon recognizing that its external count is non-zero. Only if there are no external references will the designation process 14 have to call on the more time-consuming cycle-detector 16 to determine whether the object in question must nevertheless be preserved.

The separation of references into internal and external references also permits comparison of the number of internal references to a candidate object with the number of internal references back to the candidate object contained in objects that are reachable from the candidate object but not reachable through any external reference. The procedure for comparing these two quantities is carried out by the cycle-detector 16 using a pair of dynamic counts. These counts are temporarily associated with each object during the execution of the method shown in FIG. 4C. The two counts are "dynamic" counts because they are updated during the execution of the method shown in FIG. 4C.

Figure 7:
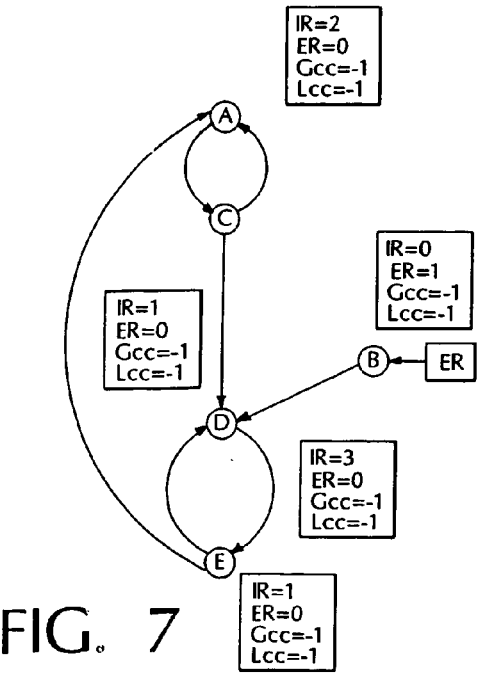
FIG. 7 shows the directed graph of FIG. 6 following deletion of an external reference.

In FIG. 7, a user has deleted the sole external reference to object A. Since object A no longer has any external references to it, it is possible that object A has been rendered unnecessary and should be destroyed. However, it is also possible that another object, which does have an external reference, also refers to object A, either directly or indirectly. The purpose of the cycle-detector 16 is to efficiently distinguish between these two cases.

For example, in FIG. 7, object B has an external reference. In addition, object B refers indirectly (by way of objects D and E) back to object A. Hence, it would be a mistake to delete object A (not to mention objects D and E) since to do so would delete an object still in use by object B.

Following deletion of the external reference, the external-reference count for object A is decremented to zero. The designation process 14, having recognized that object A has no external references (step 17 in FIG. 4B) and that it has at least one internal reference (step 21 in FIG. 4B), refers object A to the cycle-detector 16. The cycle-detector 16 then designates object A as the input object for purposes of the method shown in FIG. 4C (step 20). The cycle-detector 16 then attaches, to that object, a cycle marker that includes the global cycle-count and the local cycle-count. These counts are shown in the figures as "Gcc" and "Lcc" respectively. Counts that have not yet been initialized in this way are indicated by a value of −1 in the figures.

Figure 8:
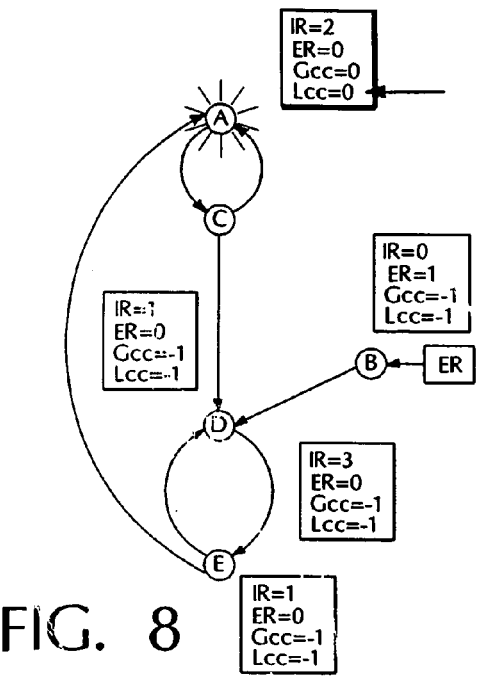
FIGS. 8–17 show the directed graph of FIG. 6 at several stages during execution of the method illustrated in FIG. 4C.

Next, the cycle-detector 16 initializes the process by setting the dynamic counts to zero (step 22) and setting the current object to be the input object, which in this case is object A (step 24). This places the digraph in the state shown in FIG. 8.

Figure 9:
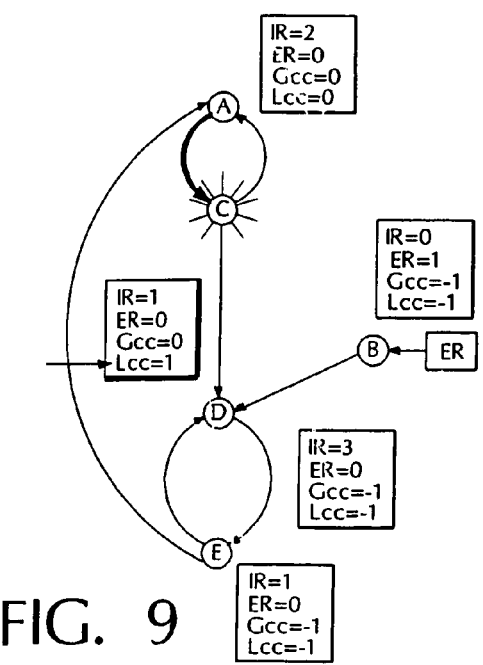

The cycle-detector 16 then traverses all links leading from the current object. To do so, the cycle-detector 16 determines whether the current object includes links to other objects (step 26) that have not been traversed. In this case, the answer is yes because object C can be reached from object A. The cycle-detector 16 then pushes the current object, which is object A, onto the stack 18 and resets the current object to the object reached, namely object C (step 28). The cycle-detector 16 then observes that the current object, namely object C, has its external-reference count set to zero, indicating that there are no external references to object C (step 30). Since there are no external references to object C, the cycle-detector 16 increments the local cycle-count for the current object. To do so, the cycle-detector 16 determines whether the current object already has an associated cycle marker (step 32). Since this is the first visit to object C, the dynamic counts have not yet been initialized. The cycle-detector 16 therefore initializes the dynamic counts to zero (step 34). Then, the cycle-detector 16 increments the local cycle-count of the current object. This places the digraph in the state shown in FIG. 9.

The cycle-detector 16 next compares the local cycle-count of the current object with the internal-reference count of the current object (step 38). If these are equal to each other, as is the case here, the global cycle-count of the previous current-object (namely object A) is incremented by the global cycle-count of the current object. The global cycle-count of the current object is then reset to zero. Since all these values are presently zero, there is no actual change in any of the global cycle-counts.

Figure 10:
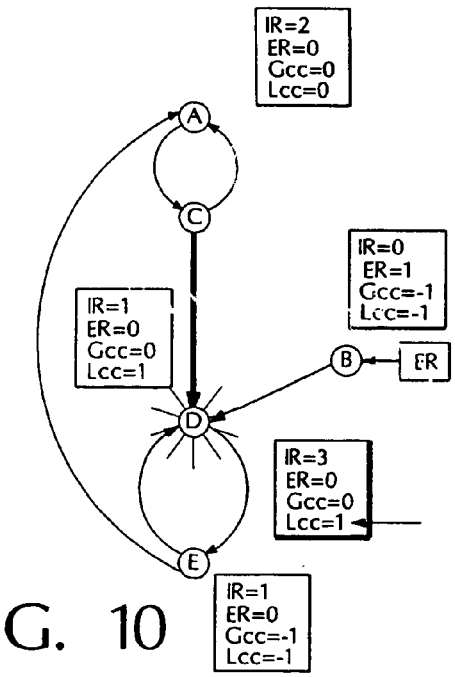

The cycle-detector 16 then determines whether there are any objects referenced by the current object, which is still set to object C (step 26). Since object C references object D, the answer is yes. Hence. the cycle-detector 16 pushes object C onto the stack 18 and resets the current object to be object D (step 28). The procedure set forth above is then repeated, except with object D as the current object. This places the digraph in the state shown in FIG. 10, in which object D has its global cycle-count set to 0 and its local cycle-count set to 1.

Figure 11:
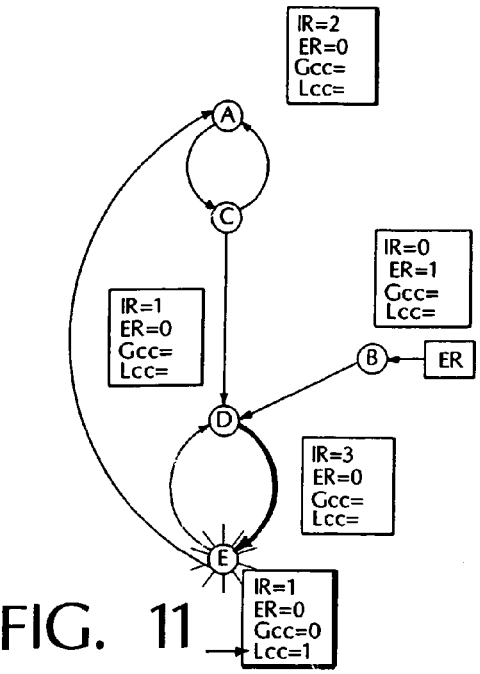

Once again, the cycle-detector 16 determines whether there are any objects referenced by the current object, which is now set to object D (step 26). Because object E can be reached from object D, the answer is "yes". The cycle-detector 16 thus proceeds as already described above, thereby placing the digraph in the state shown in FIG. 11, in which object E has its global cycle-count set to 0 and its local cycle-count set to 1.

With the current object now set to object E, the cycle-detector 16 again determines whether object E refers to any other objects (step 26). In this case, there are two references from object E: a reference to object D, and a reference to the original input object, namely object A. The cycle-detector 16 then pushes object E onto the stack 18 and sets the current object to be the input object, namely object A (step 28). This causes the cycle-detector 16 to proceed in a manner that is somewhat different from that described above.

Figure 12:
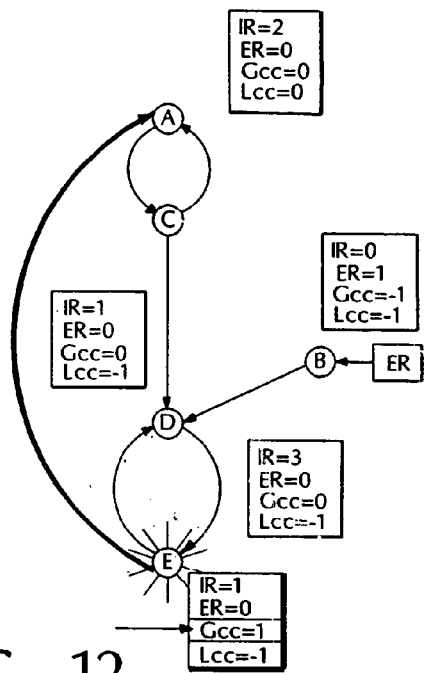

The cycle-detector 16 first determines that object A's external-reference count is still equal to zero (step 30). The cycle-detector 16 then recognizes that object A already has a cycle marker (step 32) and that object A is, in fact, the same as the input object (step 40). This causes the cycle-detector 16 to increment the global cycle-count for the most recent current object on the stack 18, namely object E, instead of the local cycle-count for the current object, namely object A (step 42). The cycle-detector 16 then pops the most recent current object, namely object E, off the stack 18 and sets the current object back to that most recently popped object (step 44). This places the digraph in the state shown in FIG. 12.

Figure 13:
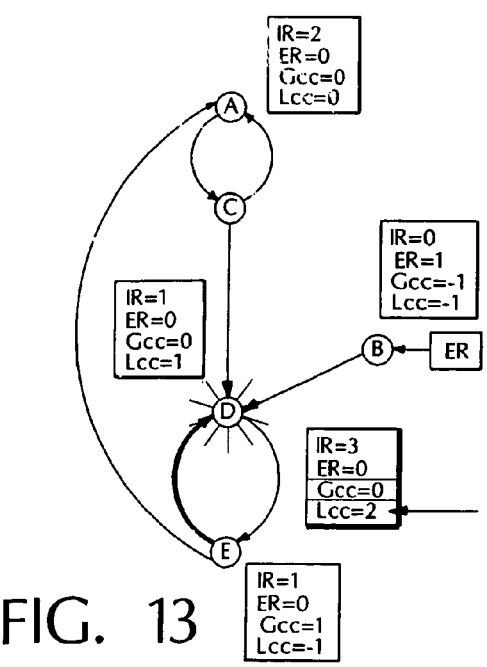

The cycle-detector 16 then traverses the remaining reference from object E, namely the one that leads back to object D. This results in object D being designated the current object (step 28). However, in this case, the cycle-detector 16 recognizes that the current object (namely object D) and the input object are not equal (step 40). The cycle-detector 16 therefore increments the local cycle-count of the current object (step 46). The cycle-detector 16 then compares the local cycle-count of the current object with the internal-reference count of the current object (step 48). Since these are unequal, the cycle-detector 16 leaves the digraph in the state shown in FIG. 13, in which object D's local cycle-count has been incremented to 2 and all global cycle-counts are unchanged.

Figure 14:
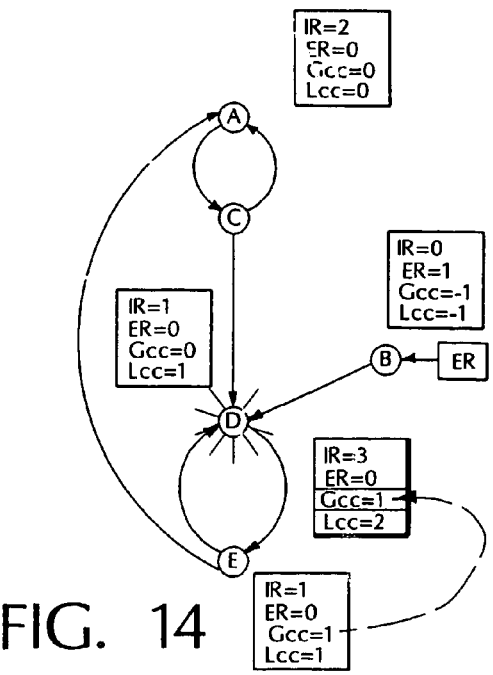

The cycle-detector 16 now recognizes that all references from the current object E have been considered (step 26) and checks to see if the current object (E) is also the input object (step 50). Since the current object (E) is not object A (the input object), the cycle-detector 16 proceeds to compare the local cycle-count of the current object (E) with the internal-reference count of the current object (step 48). This time, the internal-reference count of the current object and the local cycle-count of the current object are both equal to 1. As a result, the cycle-detector 16 increments the global cycle-count of the previous current-object (object D) by adding to it the global cycle-count of the current object. This places the digraph in the state shown in FIG. 14, in which the global and local cycle-counts of object D are set to 1 and 2 respectively.

Figure 15:
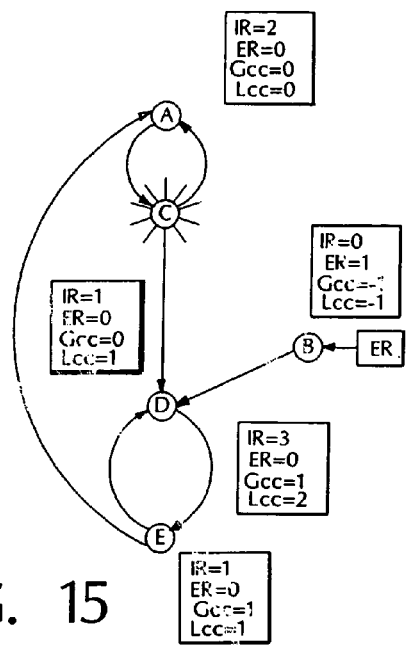

Next, the cycle-detector 16 pops the previous current-object, which is now object D, off the stack 18 and makes that object the current object (step 44). Since there are no further objects reachable from object D (step 26), and since the current object is not the input object (step 50), the cycle-detector 16 compares object D's local cycle-count with its internal-reference count (step 48). Because the local cycle-count, 2, and the internal-reference count, 3, are unequal, the global cycle-count of the previous current-object is left alone. The digraph is now in the state shown in FIG. 15.

The cycle-detector 16 then pops the previous current-object, which is object C, off the stack 18 and makes that object the current object (step 44). This time, there is one reference from the current object that has not been considered, namely the reference back to the input object (step 26). The cycle-detector 16 pushes the current object back onto the stack 18 and sets the current object to be object A (step 28). Since object A's reference count is zero (step 30), since object A already has a cycle marker (step 32), and since object A happens to be the input object (step 40), the cycle-detector 16 increments the global cycle-count of object C. This places the digraph in the state shown in FIG. 16, in which the global cycle-count of object C has been incremented to 1.

Figure 17:
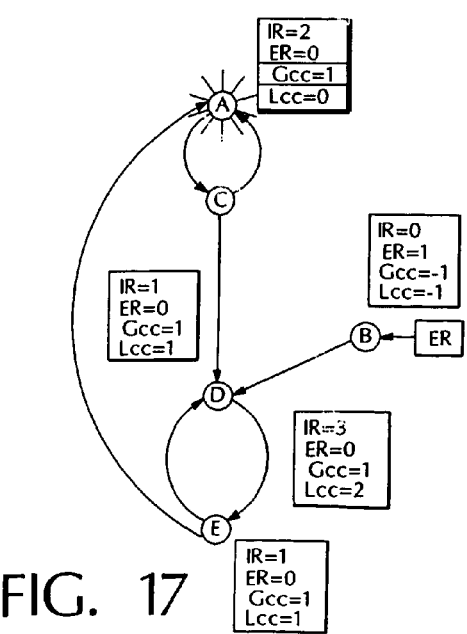

The cycle-detector 16 then pops object C back off the stack 18 (step 44) and sets the current object back to object C. This time, all references from object C have been considered (step 26). Since the current object is still not the input object (step 50), and since the local cycle-count and the internal-reference count of object C are equal, the global cycle-count of the previous current-object (which is object A) is incremented by the global cycle-count of the current object (which is now 1). This places the digraph in the state shown in FIG. 17, in which the global cycle-count of object A is now 1.

The cycle-detector 16 then pops object A off the stack 18 and sets it to be the current object (step 44). Since all references by object A have been considered (step 26), the cycle-detector 16 determines whether the current object and the input object are the same. This time, they are. The cycle-detector 16 then sets the number of cyclic paths to be the global cycle-count from the input object (step 52). This completes the first traversal of the digraph. The result of this first traversal is a digraph in which each object has a cycle marker and in which the cycle marker for the candidate object includes a global cycle-count indicating the number of cyclic paths to the candidate object.

Referring back to FIG. 4B, the cycle-detector 16 then checks to see if the number of cyclic paths is equal to the number of internal references (step 72). In this case, the answer is "no" because node A's internal-reference count is set to 2 and the number of cyclic paths (as reflected in the global cycle-count) is only 1. Accordingly, the cycle-detector does not have to check for acyclic nodes (step 74). This is because the error that can potentially be introduced by an acyclic node is one in which an externally reachable candidate object is erroneously designated for destruction. This can only happen when the number of cyclic paths is equal to the number of internal references (step 25). Accordingly, the cycle-detector 16 proceeds directly to remove all cycle markers and to set the number of cyclic paths to be the number of cyclic paths (step 76).

Finally, the number of cyclic paths and the internal-reference count for the input object are compared again (step 25), this time for the purpose of finally determining whether the object is to be preserved or destroyed. If the number of cyclic paths is less than the internal-reference count, the input object (i.e. the candidate object) can be reached indirectly by another external reference and therefore should be preserved. A number of cyclic paths that is equal to the internal-reference count indicates that the input object is not reachable by an external reference and can be safely destroyed. In this case, the global cycle-count of object A, which is 1, is less than its internal-reference count, which is 2. Consequently, the candidate object is designated for preservation (step 29).

A procedure for deleting cycle markers is shown in detail in FIG. 4D. This procedure traverses the digraph in the same manner already discussed in connection with FIG. 4C. The differences between the procedure of FIG. 4C and that of FIG. 4D lies primarily in the actions taken at each node.

The procedure is initialized by setting an input object to be the candidate object (step 80). Then, the current object is set to be the input object (step 82). The cycle-detector 16 then determines whether there are additional objects that can be reached from the current object (step 84).

If there are additional objects that can be reached from the current object, then the current object is pushed onto the stack and the object that was reachable from the current object becomes the new current object (step 86). This new current object is then examined to determine if it has a cycle marker (step 88). If the answer is "yes", the cycle marker is removed (step 90) and the cycle-detector proceeds to the next object, if any (step 84). If the answer is "no", the cycle-detector pops the current object off the stack (step 92) and proceeds to the next object, if any (step 84).

Eventually, the cycle-detector 16 reaches a point at which all nodes reachable from a particular node have been examined. The cycle-detector 16 recognizes this by noting that there are no more objects that can be reached from the current object (step 84). When this is the case, the cycle-detector 16 determines whether the current object is the input (i.e. candidate) object (step 94). If it is not, the cycle-detector 16 pops the previous current object off the stack (step 92) and thereby works its way backward toward the candidate object. If it is, the cycle detector removes the cycle marker of the candidate object and stores the value of the global cycle-count (step 96). This value is then compared with the number of internal references (step 27 in FIG. 4B) to determine whether the object should be destroyed.

Figure 19:
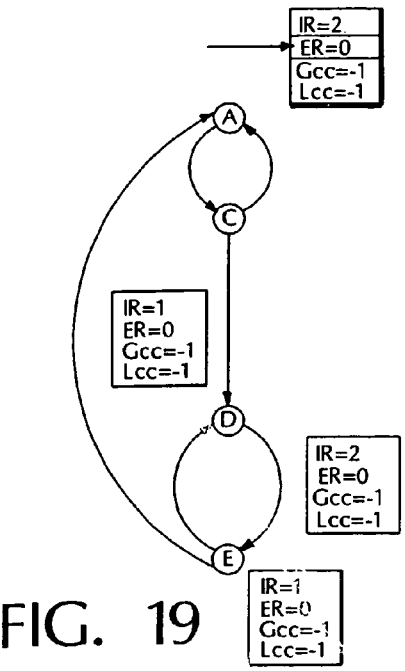

FIG. 18 shows a digraph that is identical to that shown in FIG. 4C with the exception that object B and its external reference have been removed. When the external reference to object A is removed, as shown in FIG. 19, the digraph becomes isolated from all external references. In this case, it is sensible to destroy objects A, C, D, and E to conserve system resources. The remaining figures, considered in conjunction with FIG. 4C, illustrate the manner in which the designation process 14 achieves this.

Figure 20:
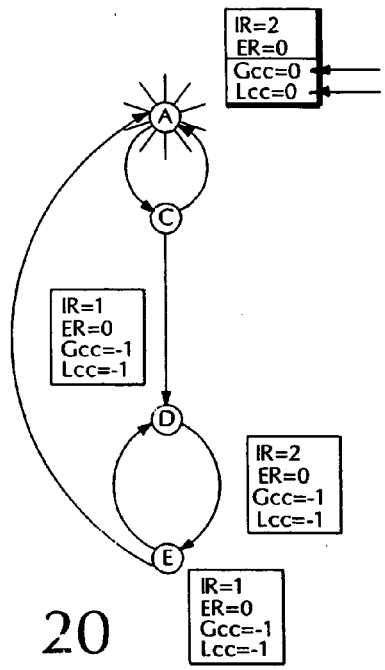
Figure 21:
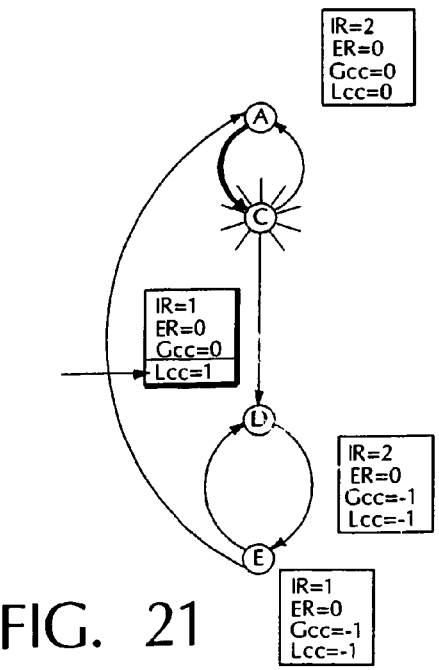
Figure 22:
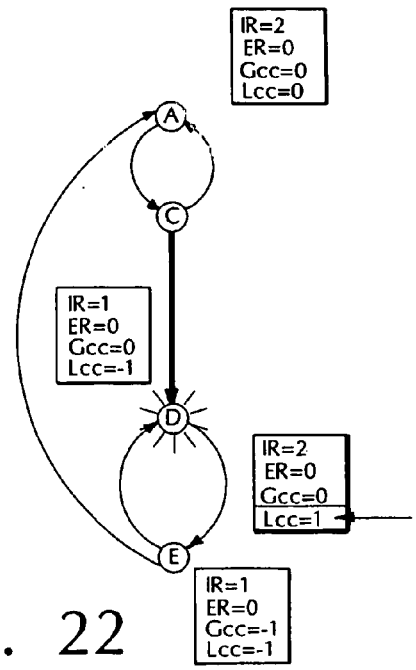
Figure 23:
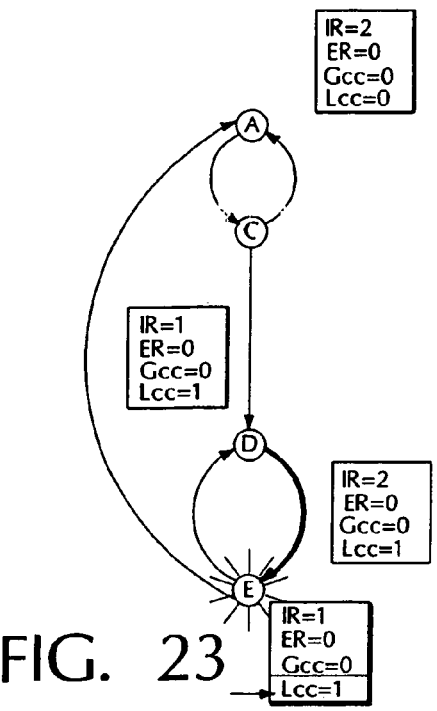
Figure 24:
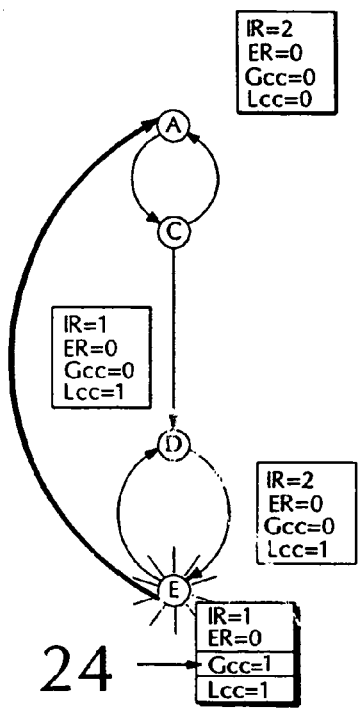
Figure 25:
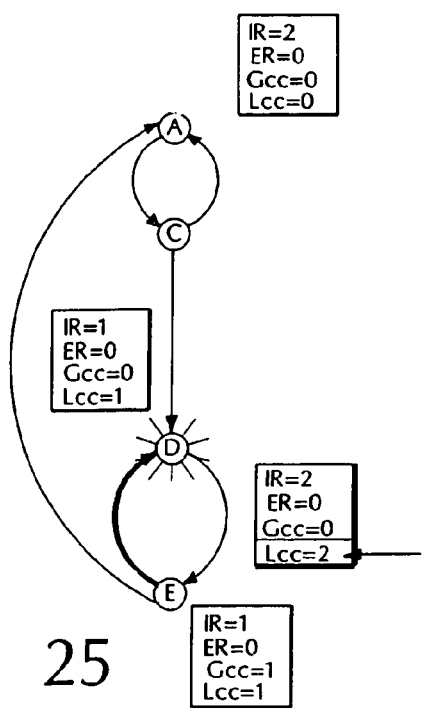
Figure 26:
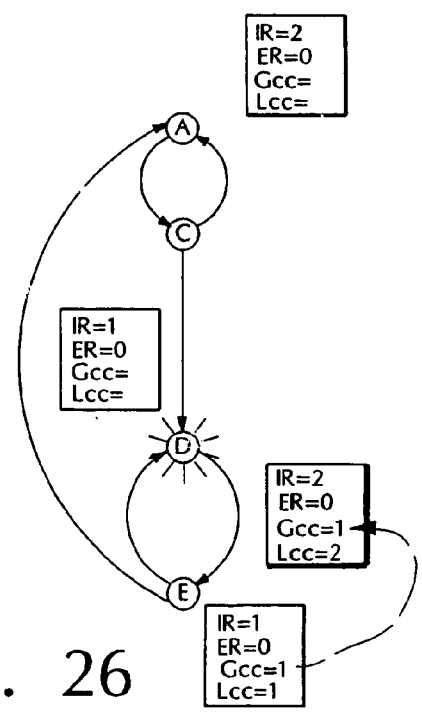
Figure 27:
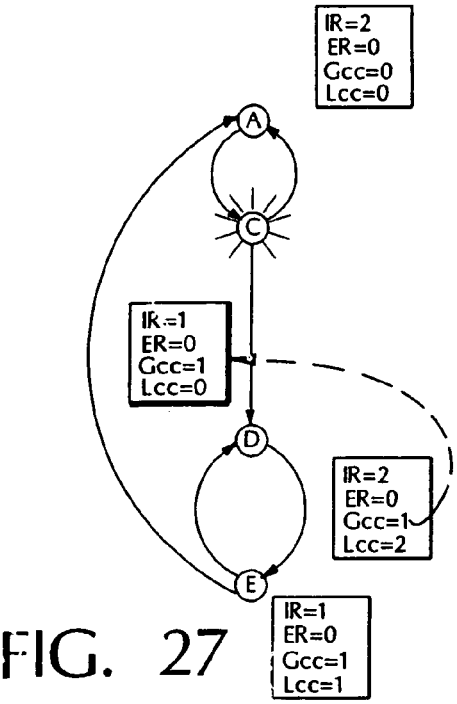
Figure 28:
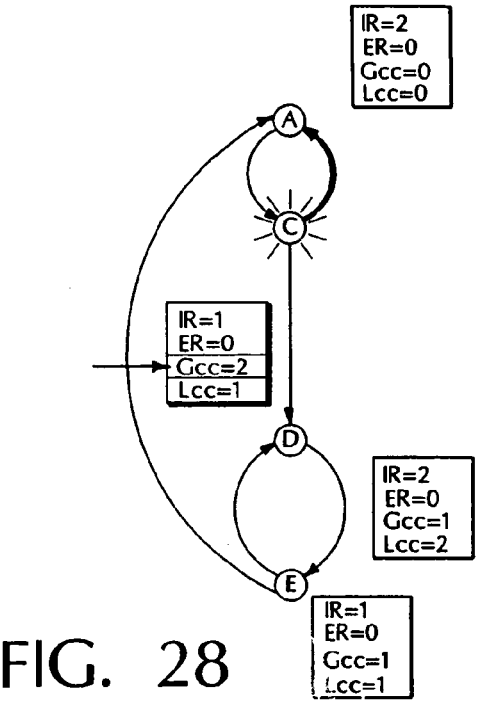
Figure 29:
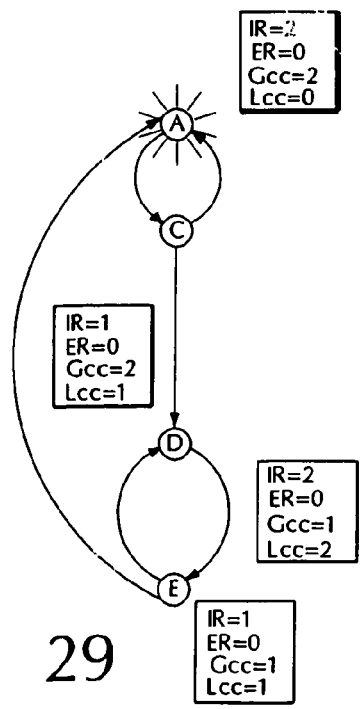

The procedure for determining whether to destroy object A proceeds similarly to that described in connection with FIGS. 7–17. Dynamic counters for object A are initialized to zero, as shown in FIG. 20. The local cycle-count for objects C, D, and E are then incremented, as shown in FIGS. 21–23. Because object E has a reference back to object A, the global cycle-count for object E is incremented, as shown in FIG. 24. The local cycle-counter for object D is incremented for the second time in FIG. 25. Object D's global cycle-count then inherits the value of the global cycle-count of object E, as shown in FIG. 26. These transitions all occur for the same reasons already described in connection with FIGS.

Next, the cycle-detector 16 pops the previous current-object, which is now object D, off the stack 18 and makes that object the current object (step 44). Since there are no further objects reachable from object D (step 26), and since the current object is not the input object (step 50), the cycle-detector 16 compares object D's local cycle-count with its internal-reference count (step 48). This time, and in contrast to the previous example, the local cycle-count, 2, and the internal-reference count, 2, are equal. Therefore, the global cycle-count of the previous current-object is incremented by the global cycle-count of the current object. This places the digraph in the state shown in FIG. 27, in which object C inherits the global cycle-count of object D.

Figure 16:
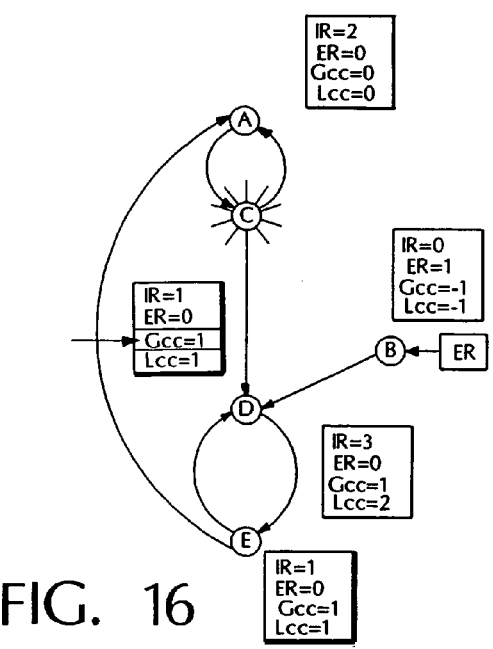

The global cycle-count is again incremented for reasons already discussed in connection with FIG. 16. This places the digraph in the state shown in FIG. 28, in which the global cycle-count of object C is now equal to the internal-reference count of the input object. As a result, when the input object inherits the global cycle-count of object C, for reasons already discussed in connection with FIG. 17, its global cycle-count becomes equal to its internal-reference count. This places the digraph in the state shown in FIG. 29.

Referring now to FIG. 4B, following execution of the procedure for counting cyclic paths (step 70), the cycle-detector 16 asks whether the number of cyclic paths is equal to the number of internal references to the candidate object (step 72). In the first example, namely that detailed in FIGS. 6–17, the answer was "no" and the step of determining whether the digraph includes acyclic nodes (step 74) could be skipped over. In this second example, the answer is "yes".

In many cases, the equality of a candidate object's internal-reference count and its global cycle-count means that the candidate object can be safely destroyed. However, there are certain cases in which, in spite of the equality of its internal-reference count and its global cycle-count, a candidate object must be preserved. These cases are associated with the existence of an acyclic node on one of the cyclic paths to the candidate object.

One case in which the procedure of FIG. 4C is insufficient arises when the digraph includes an acyclic node that lacks a direct link to the candidate object. For example, FIG. 30 shows a digraph in which the candidate object A is externally reachable by the external reference to object D. However, following application of the procedure for counting cyclic paths (FIG. 4B, step 70), the candidate object's internal-reference count matches its number of cyclic paths, as reflected in its global cycle-count. Unless some action is taken to correct this, the candidate object would be erroneously deleted (FIG. 4B, step 25).

The difficulty in processing the digraph of FIG. 30 arises because object B is reached twice during the first traversal of the digraph: once from object A and again from the acyclic object C. As a result, its local cycle-count, which is 2, matches its internal-reference count. This causes candidate object A to inherit object B's global cycle-count (step 38 in FIG. 4C). However, earlier in the traversal of the digraph, object B's direct reference back to candidate object A resulted in incrementing object B's global cycle-count to 1 (step 42 in FIG. 4C). Hence, when object A finally inherits its global cycle-count from object B, it inherits a global cycle-count that is equal to its internal-reference count, even though it is clear from inspection that object A is externally reachable.

Whether a particular node is acyclic cannot readily be determined until the digraph has been traversed. Hence, to identify acyclic nodes, it is necessary to undertake an additional traversal of the digraph. During this second traversal, the cycle-detector 16 identifies any acyclic nodes, as shown in FIG. 4E, and classifies acyclic nodes thus identified, as shown in FIG. 4F.

The procedure shown in FIG. 4E traverses the digraph in the same manner already discussed in connection with FIGS. 4C and 4D. The differences between the procedure of FIG. 4E and the procedures discussed in FIGS. 4C and 4D lie in the processing that occurs at each node. The steps associated with traversing the digraph in FIG. 4E therefore need not be discussed in detail again.

The key step shown in FIG. 4E is the comparison between a node's local cycle-count and its internal-reference count (step 100). It is this step that determines whether a particular node is acyclic or not. If the local cycle-count and the internal-reference count are the same, then the node in question is cyclic and need not be considered further. Hence, the cycle-detector 16 proceeds to the next node on the digraph (step 101).

On the other hand, if the local cycle-count and the internal-reference count differ, then the node in question is acyclic. In this case, the cycle-detector 16 calls a node-classifying procedure (illustrated in FIG. 4F) for classifying the acyclic node (step 110) as either a "benign" acyclic node (one which does not introduce error) or as a "malignant" acyclic node (one which does introduce an error). The node-classifying procedure returns a binary value that indicates whether the acyclic node is malignant or benign. In FIG. 4E, the binary values are indicated as being "true" and "false".

The cycle-detector 16 next determines which of the two binary values the node-classifying procedure returned (step 112). A return value of "false" indicates a benign acyclic node. When this occurs, the cycle-detector 16 simply proceeds to the next node. A return value of "true" indicates a malignant acyclic node that would result in erroneous destruction of the candidate object. When this occurs, the cycle-detector 16 sets the global cycle-count of the candidate object to be zero. This ensures that the node will not be designated for destruction. Since the existence of one malignant acyclic node is enough to signify that the object should be preserved, there is no need to traverse the digraph further following discovery of a malignant acyclic node. Hence, after setting the global cycle-count of the candidate object to zero, the cycle-detector terminates the second traversal of the digraph (step 116).

The procedure for determining whether a particular acyclic node is of the benign or malignant variety is shown in FIG. 4F. The illustrated procedure traverses the digraph beginning at the acyclic node in question and using the procedure already discussed above in connection with FIG. 4C. The key step in establishing malignancy of an acyclic node to determine whether there exists a node that is both reachable from the acyclic node and that has a non-zero global cycle-count (step 120). If such a node is encountered, the procedure recognizes that acyclic node as malignant and immediately returns a value of "true" (step 122). Otherwise, the procedure continues to traverse the digraph until all nodes reachable from the acyclic node have been considered, at which point the procedure returns "false" (step 124) to indicate that the acyclic node is benign.

In the foregoing example, objects refer to other objects for the particular purpose of filling in field values. However, this is not the only reason for having one object refer to another object. The invention described herein does not depend on the purpose of a reference between objects. All that is necessary for practice of the invention is an environment in which objects can refer to one another.

One example of objects referring to each other for a purpose unrelated to filling in field values arises in the context of a system block diagram. In such a block diagram, a parent block might be defined in terms of an interconnection of constituent child blocks. In such a case, it is desirable to accompany the destruction of the object corresponding to the parent block with the destruction of the objects corresponding to the child blocks.

FIG. 31 shows a corresponding data-structure in which the parent block and the child blocks form a tree 62 having a root node 64 corresponding to the parent block and a collection of child nodes 65a–d corresponding to the child blocks.

As used herein, the term "tree" means a special case of a digraph in which there are no cyclic paths and in which each node can have no more than one parent node (i.e. a node referencing that node). This property of trees provides an opportunity for bypassing certain steps in the method shown in FIG. 4C when the object being considered for destruction is known to be part of a tree.

If an external reference to a node is deleted, in many cases it is not necessary to traverse the entire tree 62 to determine that the node can be safely destroyed. To exploit this property, it is useful to differentiate between references that are known to be in a tree and references that may not be part of a tree. Differentiation between these two references makes it possible to implement an alternative cycle-detecting process shown in FIG. 32.

Figure 32:
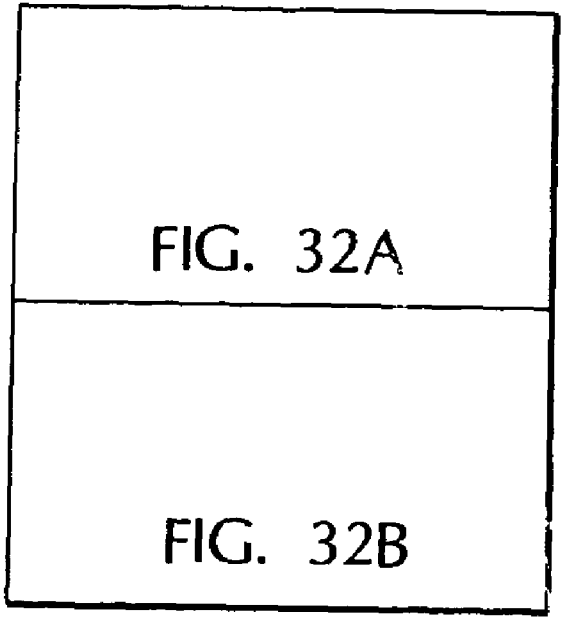
Figure 32A:
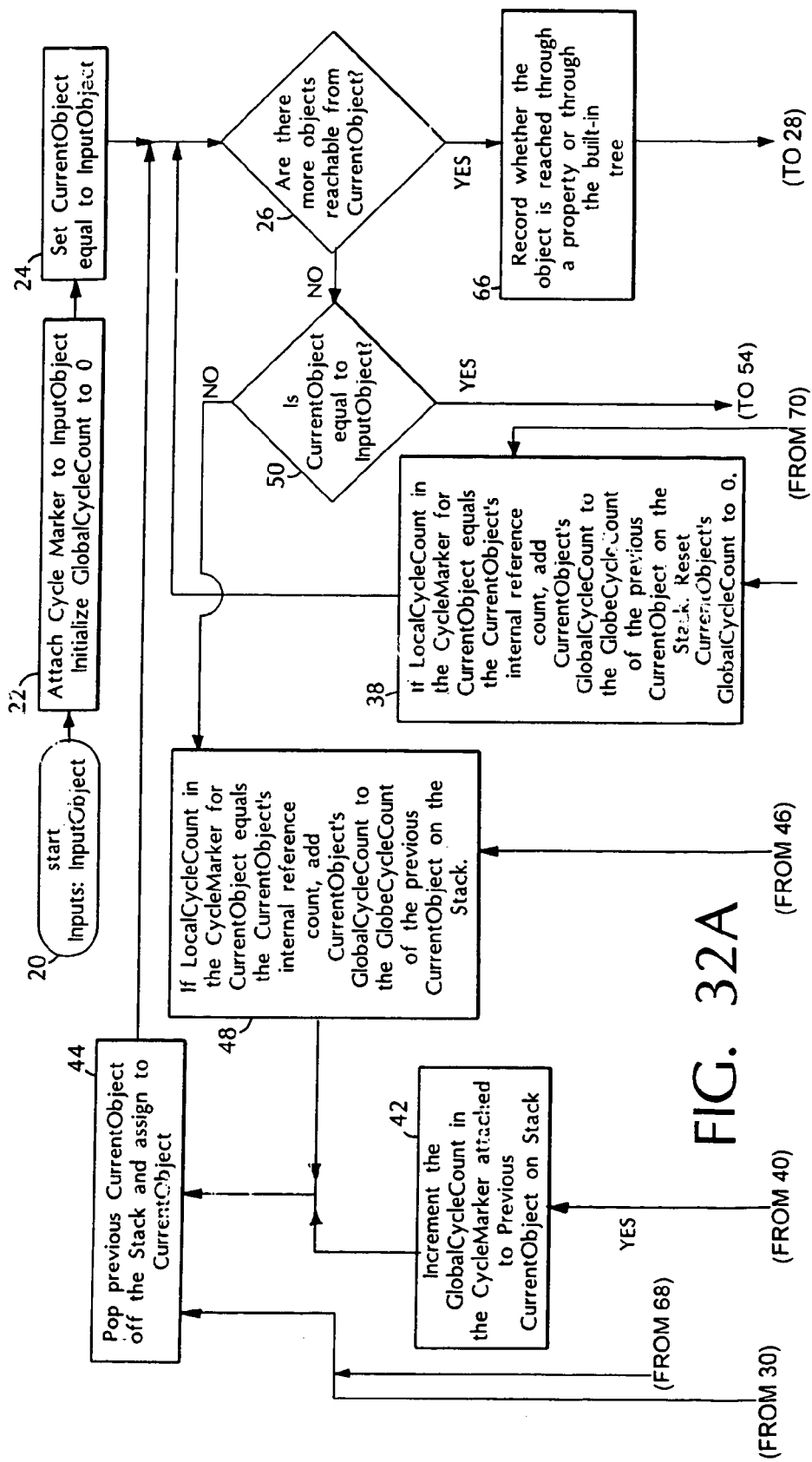
Figure 32B:
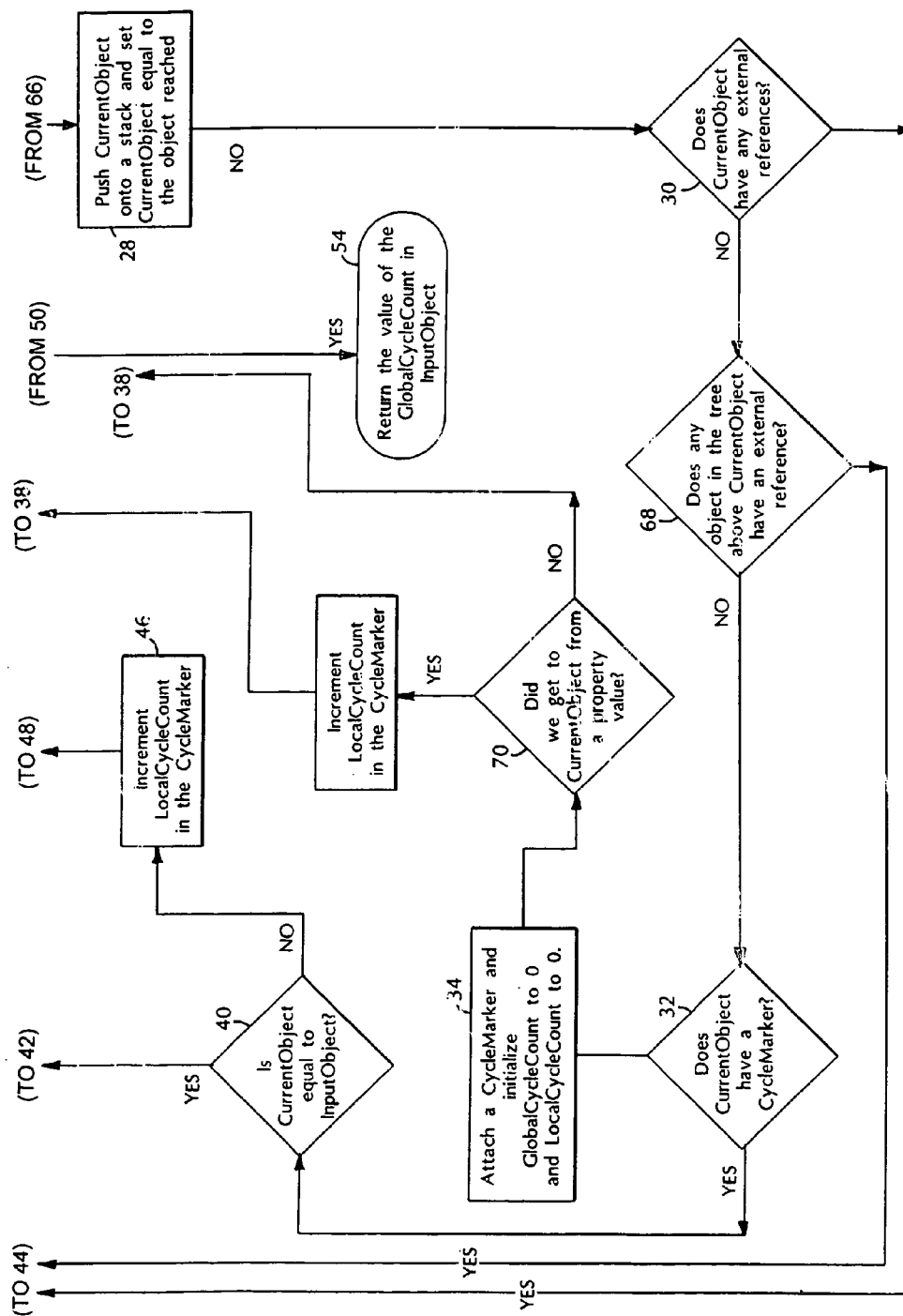

The method shown in FIG. 32 is similar to that shown in FIG. 4C, with the exception of additional steps that direct the flow of control to one of two other steps on the basis of whether or not the current object is the part of a tree.

In the alternative method, the cycle-detector 16 recognizes whether the current object was reached because it was part of a tree, as shown in FIG. 31, or if the current object was reached in an effort to fill in a field value (step 66), in which case the object may or may not be part of a tree.

If the current object does not have any external references (step 30), the cycle-detector 16 traverses the tree up to its root node to determine whether any object in the tree above the current object has an external reference (step 68). If the answer is yes, the cycle-detector replaces the current object with the previous current-object (step 44), skipping over several steps in the illustrated method. Otherwise, the method proceeds as already discussed above in connection with FIG. 4C.

Following its first encounter with a current object (steps 32, 34), the cycle-detector 16 branches on the basis of the information recorded in step 66 (step 70). If the current object was reached as part of a tree, as shown in FIG. 31, the cycle-detector 16 does not increment the local cycle-count of the current object at all (step 36). This is because the references that make up a tree are not counted in the internal reference count and thus, they should not be counted in the local cycle count. Instead, the cycle detector 16 skips directly to comparing the local cycle-count of the current object with the internal-reference count of that object (step 38).

An environment for carrying out the method shown in FIG. 32 requires that each object identify those references that are used to compose a tree.

Other implementations are within the scope of the following claims.

I claim:

1. In an electronic device, a method for controlling disposition of a candidate object in an object-oriented environment, said method comprising:
   determining a first value indicative of a number of references to said candidate object that are not references from other objects in the object-oriented environment;
   determining a second value indicative of a number of references to said candidate object from other objects in the object-oriented environment;
   determining a third value indicative of a number of cyclic paths including said candidate object;
   controlling disposition of said candidate object on the basis of said first value, said second value and said third value;
   wherein a cyclic path is a strongly connected component such that no node within the strongly connected component has an external reference and no node within the strongly connected component is connected, either directly or indirectly, to an object having an external reference.

2. The method of claim 1, wherein determining said first value comprises reading an external-reference count.

3. The method of claim 1, wherein controlling disposition of said candidate object on the basis of said first value comprises:
   determining, on the basis of said first value, whether there exists at least one reference to said candidate object that is not from another object in the object-oriented environment; and
   marking said candidate object for preservation if there exists at least one reference to said candidate object that is not from another object in the object-oriented environment.

4. The method of claim 1, wherein determining said second value comprises reading an internal-reference count.

5. The method of claim 1, wherein determining said third value comprises:
   identifying a referred object that lies on a path containing a reference originating at said candidate object;

determining a fourth value indicative of a number of references to said referred object that originate at other objects in the object-oriented environment, said fourth value being associated with said referred object; and determining a fifth value indicative of the number of cyclic paths to said candidate object that pass through said referred object, said fifth value being associated with said referred object.

6. The method of claim 5, wherein determining said third value further comprises;

initializing a sixth value associated with said referred object, said sixth being indicative of a number of cyclic paths known to include said candidate object and said referred object; and adjusting said sixth value if said referred object has a reference directly to said candidate object.

7. The method of claim 6, wherein determining said third value further comprises;

identifying a referring object having a reference to said referred object; and detecting a defined relationship between said fifth value and said sixth value associated with said referred object, adjusting a seventh value associated with said referring object in response to detection of said defined relationship, maid seventh value being indicative of a number of known cyclic paths that include said candidate object and said referring object.

8. The method of claim 7, wherein detecting said defined relationship between said fifth value and said sixth value comprises determining that said fifth value and said sixth value are equal to each other.

9. The method of claim 7, wherein adjusting said seventh value comprises adjusting said seventh value by an amount corresponding to said sixth value.

10. The method of claim 1, wherein controlling disposition of said candidate object on the basis of said second value and said third value comprises:

determining if said candidate object is externally unreachable or externally reachable;

designating said candidate object for destruction if said candidate object is externally unreachable; and designating said candidate object for preservation if said candidate object is externally reachable.

11. The method of claim 1, wherein:

determining said third value comprises:

classifying a path to said candidate object as originating at an external reference or not originating at an external reference; and controlling disposition of said candidate object comprises designating said candidate object for destruction if no path to said candidate object originates at an external reference.

12. The method of claim 11, wherein classifying said path comprises:

for each object on said path, determining if said object has an external reference; and classifying said path on the basis of whether at least one object on said path has a reference selected from the group consisting of an external reference and an internal reference from an object not reachable from said candidate object.

13. The method of claim 1, wherein controlling disposition of said candidate object on the basis of said first value comprises:

determining whether said candidate object is referenced from outside of a tree; and marking said candidate object for preservation if there exists a reference to said candidate object from a tree.

14. In an electronic device, a method for automatic control of disposition of a candidate object in an object-oriented programming environment, said method comprising:

detecting deletion of a reference to a candidate object;

determining a number of cyclic paths that include said candidate object in the object-oriented programming environment;

determining a number of internal references to said candidate object, wherein internal references are references from other objects in the object-oriented programming environment;

controlling disposition of said candidate object on the basis of a defined relationship between said number of internal references and said number of cyclic paths;

wherein a cyclic path is a strongly connected component such that no node within the strongly connected component has an external reference and no node within the strongly connected component is connected, either directly or indirectly, to an object having an external reference.

15. A computer-readable medium having encoded thereon software for causing a computer to control disposition of a candidate object in an object-oriented environment, said software comprising instructions for causing a computer to:

determine a first value indicative of a number of references to said candidate object that are not references from other objects in the object-oriented environment;

determine a second value indicative of a number of references to said candidate object from other objects in the object-oriented environment;

determine a third value indicative of a number of cyclic paths including said candidate object;

control disposition of said candidate object on the basis of said first value, said second value and said third value, wherein a cyclic path is a strongly connected component such that no node within the strongly connected component has an external reference and no node within the strongly connected component is connected, either directly or indirectly, to an object having an external reference.

16. The computer-readable medium of claim 15, wherein said instructions for:

determining said first value comprise instructions for causing said computer to read an external-reference count.

17. The computer-readable medium of claim 15, wherein said instructions for controlling disposition of said candidate object on the basis of said first value comprise instructions for causing a computer to:

determine, on the basis of said first value, whether there exists at least one reference to said candidate object that is not from another object in the object-oriented environment; and mark said candidate object for preservation if there exists at least one reference to said candidate object that is not from another object in the object-oriented environment.

18. The computer-readable medium of claim 15, wherein said instructions for causing said computer to determine said second value comprise instructions for causing said computer to read an internal-reference count.

19. The computer-readable medium of claim 15, wherein said instructions for causing said computer to determine said third value comprise instructions for causing said computer to:

identify a referred object that lies on a path containing a reference originating at said candidate object;

determine a fourth value indicative of a number of references to said referred object that originate at other objects in the object-oriented environment, said fourth value being associated with said referred object; and determine a fifth value indicative of the number of cyclic paths to said candidate object that pass through said referred object, said fifth value being associated with said referred object.

20. The computer-readable medium of claim 19, wherein said instructions for causing said computer to determine said third value further comprise instructions for causing said computer to:

initialize a sixth value associated with said referred object, said sixth value being indicative of a number of cyclic paths known to include said candidate object and said referred object; and adjust said sixth value if said referred object has a reference directly to said candidate object.

21. The computer-readable medium of claim 20, wherein said instructions for causing said computer to determine said third value further comprise instructions for causing said computer to;

identify a referring object having a reference to said referred object; and detect a defined relationship between said fifth value and said sixth value associated with said referred object, adjust a seventh value associated with said referring object in response to detection of said defined relationship, said seventh value being indicative of a number of known cyclic paths that include said candidate object and said referring object.

22. The computer-readable medium of claim 21, wherein said instructions for causing said computer to detect said defined relationship between said fifth value and said sixth value comprise instructions for causing said computer to determine that said fifth value and said sixth value are equal to each other.

23. The computer-readable medium of claim 21, wherein said instructions for causing said computer to adjust said seventh value comprise instructions for causing said computer to adjust said seventh value by an amount corresponding to said sixth value.

24. The computer-readable medium of claim 15, wherein said instructions for causing computer to control disposition of said candidate object on the basis of said second value and said third value comprise instructions for causing said computer to: determine if said candidate object is externally unreachable or externally reachable; designate said candidate object for destruction if said candidate object is externally unreachable; and to designate said candidate object for preservation if said candidate object is externally reachable.

25. The computer-readable medium of claim 15, wherein:

said instructions for causing said computer to determine said third value comprise instructions for causing said computer to:

classify a path to said candidate object as originating at an external reference or not originating at an external reference; and said instructions for causing said computer to control disposition of said candidate object comprise instructions for causing said computer to designate said candidate object for destruction if no path to said candidate object originates at an external reference.

26. The computer-readable medium of claim 25, wherein said instructions for causing said computer to classify said path comprise instructions for causing said computer to:

for each object on said path, determine if said object has an external reference; and classify said pat on the basis of whether at least one object on said path has reference selected from the group consisting of an external reference and an internal reference not reachable from said candidate object.

27. The computer-readable medium of claim 15, wherein said instructions for causing said computer to control disposition of said candidate object on the basis of said first value comprise instructions for causing said computer to:

determine whether said candidate object is referenced from outside of a tree; and mark said candidate object for preservation of there exists a reference to said candidate object from a tree.

28. A computer-readable medium having encoded thereon software for causing a computer to automatically control disposition of a candidate object in an object-oriented programming environment, said software comprising instructions for causing said computer to:

detect deletion of a reference to a candidate object;

determine a number of cyclic pats that include said candidate object;

determine a number of internal references to said candidate object, wherein internal references originate from other objects in the object-oriented programming environment;

control disposition of said candidate object on the basis of a defined relationship between said number of internal references and said number of cyclic paths;

wherein a cyclic path is a strongly connected component such that no node within the strongly connected component has an external reference and no node within the strongly connected component is connected, either directly or indirectly, to an object having an external reference.

* * * * *